United States Patent
Rappel-Kroyzer et al.

(10) Patent No.: US 12,140,442 B2
(45) Date of Patent: Nov. 12, 2024

(54) CLUSTERING EVENT INFORMATION FOR VEHICLE NAVIGATION

(71) Applicant: Mobileye Vision Technologies Ltd., Jerusalem (IL)

(72) Inventors: Or Rappel-Kroyzer, Jerusalem (IL); Amit Raphael, Tekoa (IL); Ido Karavany, Gvaot Bar (IL); Sergei Kom, Modiin (IL); Amir Chanovsky, Nahariya (IL); Eran Avidan, Rehovot (IL); Eiran Bolless, Yavne (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 387 days.

(21) Appl. No.: 17/377,054

(22) Filed: Jul. 15, 2021

(65) Prior Publication Data
US 2021/0341303 A1    Nov. 4, 2021

Related U.S. Application Data

(63) Continuation of application No. PCT/US2020/014962, filed on Jan. 24, 2020.
(Continued)

(51) Int. Cl.
*G06F 16/00* (2019.01)
*G01C 21/34* (2006.01)
(Continued)

(52) U.S. Cl.
CPC ..... *G01C 21/3492* (2013.01); *G01C 21/3691* (2013.01); *G06F 16/24556* (2019.01);
(Continued)

(58) Field of Classification Search
None
See application file for complete search history.

(56) References Cited

U.S. PATENT DOCUMENTS

| | | | |
|---|---|---|---|
| 2014/0310702 A1* | 10/2014 | Ricci | G06Q 20/321 717/173 |
| 2015/0081212 A1 | 3/2015 | Mitchell et al. | |

(Continued)

FOREIGN PATENT DOCUMENTS

| | | |
|---|---|---|
| CN | 105321338 A | 2/2016 |
| CN | 108628206 A | 10/2018 |

(Continued)

OTHER PUBLICATIONS

International Search Report in PCT/US2020/014962 dated Jan. 24, 2020 (15 pages).

(Continued)

*Primary Examiner* — Thu Nguyet T Le
(74) *Attorney, Agent, or Firm* — Finnegan, Henderson, Farabow, Garrett & Dunner, LLP

(57) ABSTRACT

Systems and methods are disclosed for aggregating informational reports. In one implementation, at least one processor may be programmed to receive an informational vehicle report identifying a detected event; store the report in a database in association with a first cell; query a second cell within a predetermined distance of the first cell; and determine whether the second cell is associated with the detected event. When the second cell is associated with the detected event the processor may aggregate information from the first and second cells to provide an aggregated cluster and generate an event report based on the aggregated cluster. When the second cell is not associated with an information cluster associated with the detected event, the (Continued)

processor may generate the event report based on the stored informational vehicle report. The processor may then transmit the event report to one or more vehicles.

20 Claims, 33 Drawing Sheets

Related U.S. Application Data

(60) Provisional application No. 62/956,929, filed on Jan. 3, 2020, provisional application No. 62/796,355, filed on Jan. 24, 2019.

(51) Int. Cl.
| | | |
|---|---|---|
| *G01C 21/36* | (2006.01) | |
| *G06F 16/2455* | (2019.01) | |
| *G06F 16/28* | (2019.01) | |
| *G06F 16/29* | (2019.01) | |
| *G08G 1/01* | (2006.01) | |
| *G08G 1/0967* | (2006.01) | |
| *G06V 20/58* | (2022.01) | |

(52) U.S. Cl.
CPC .......... *G06F 16/285* (2019.01); *G06F 16/29* (2019.01); *G08G 1/0112* (2013.01); *G08G 1/0133* (2013.01); *G08G 1/096708* (2013.01); *G06V 20/58* (2022.01)

(56) References Cited

U.S. PATENT DOCUMENTS

| | | |
|---|---|---|
| 2016/1331301 | 5/2018 | Grimm et al. |
| 2018/0247541 A1 | 8/2018 | Cheremushkina et al. |
| 2018/0276351 A1* | 9/2018 | Patton ............... H04L 51/52 |
| 2018/0367958 A1* | 12/2018 | Dizdarevic ............ G08G 1/012 |

FOREIGN PATENT DOCUMENTS

| | | |
|---|---|---|
| JP | 2005-266926 A | 9/2005 |
| JP | 2013-515325 A | 5/2013 |
| WO | WO 2014/151793 A2 | 9/2014 |
| WO | WO 2017/214990 A1 | 12/2017 |

OTHER PUBLICATIONS

Office Action issued in Japanese Patent Application No. 2021-540051, dated Jun. 6, 2023, and an English translation thereof (9 pages).

Office Action issued in Chinese Patent Application No. 202080010517.2, dated Aug. 15, 2023, and an English translation thereof (30 pages).

Office Action issued in Japanese Patent Application No. 2021-540051, dated Nov. 29, 2022, and an English translation thereof (10 pages).

* cited by examiner

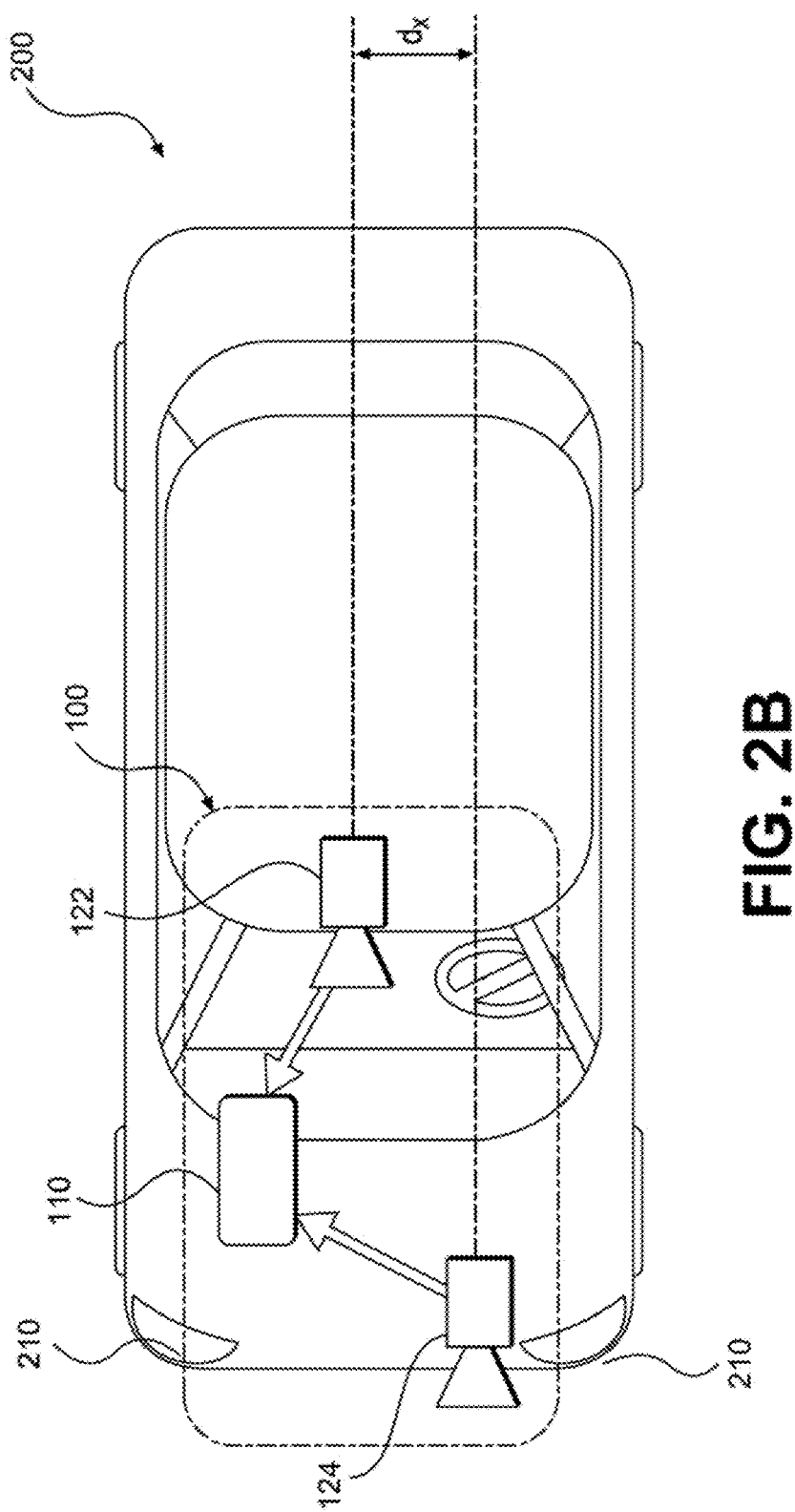

CLUSTERING EVENT INFORMATION FOR VEHICLE NAVIGATION

CROSS REFERENCES TO RELATED APPLICATIONS

This application is a continuation of International Application No. PCT/US2020/014962, filed on Nov. 26, 2019, which claims the benefit of priority of U.S. Provisional Application No. 62/796,355, filed on Jan. 24, 2019, and U.S. Provisional Application No. 62/956,929, filed on Jan. 3, 2020. The foregoing applications are incorporated herein by reference in their entirety.

BACKGROUND

Technical Field

The present disclosure relates generally to systems and methods for clustering event information for use in vehicle navigation.

Background Information

As technology continues to advance, the goal of a fully autonomous vehicle that is capable of navigating on roadways is on the horizon. Autonomous vehicles may need to take into account a variety of factors and make appropriate decisions based on those factors to safely and accurately reach an intended destination. For example, an autonomous vehicle may need to process and interpret visual information (e.g., information captured from a camera) and may also use information obtained from other sources (e.g., from a GPS device, a speed sensor, an accelerometer, a suspension sensor, etc.). At the same time, in order to navigate to a destination, an autonomous vehicle may also need to identify its location within a particular roadway (e.g., a specific lane within a multi-lane road), navigate alongside other vehicles, avoid obstacles and pedestrians, observe traffic signals and signs, and travel from on road to another road at appropriate intersections or interchanges. Harnessing and interpreting vast volumes of information collected by an autonomous vehicle as the vehicle travels to its destination poses a multitude of design challenges. The sheer quantity of data (e.g., captured image data, map data, GPS data, sensor data, etc.) that an autonomous vehicle may need to analyze, access, and/or store poses challenges that can in fact limit or even adversely affect autonomous navigation. Furthermore, if an autonomous vehicle relies on traditional mapping technology to navigate, the sheer volume of data needed to store and update the map poses daunting challenges.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle. The disclosed systems and methods may provide a navigational response based on, for example, an analysis of images captured by one or more of the cameras. The disclosed systems may also provide for constructing and navigating with a crowdsourced sparse map. Other disclosed systems may use relevant analysis of images to perform localization that may supplement navigation with a sparse map. The navigational response may also take into account other data including, for example, global positioning system (GPS) data, sensor data (e.g., from an accelerometer, a speed sensor, a suspension sensor, etc.), and/or other map data.

In an embodiment, a system for aggregating informational reports received from a plurality of vehicles is disclosed. The system may comprise at least one processing device programmed to receive, from a host vehicle, an informational vehicle report. The informational vehicle report may include information identifying a detected event and a detected location of the event in an environment of a host vehicle. The at least one processing device may then store the informational vehicle report in a database in association with a first cell. The first cell may be associated with a spatial region that includes the detected location. The at least one processing device may then query a second cell stored in the database, wherein the second cell is within a predetermined distance of the first cell; and determine whether the second cell is associated with an information cluster associated with the detected event. When the second cell is associated with an information cluster associated with the detected event, the at least one processing device may be configured to aggregate the informational vehicle report of the first cell with the information cluster associated with the second cell to provide an aggregated cluster; generate an event report for the detected event based on information associated with the aggregated cluster; and transmit the event report to the host vehicle. When the second cell is not associated with an information cluster associated with the detected event, the at least one processing device may be configured to generate the event report for the detected event based on the stored informational vehicle report and transmit the event report to the host vehicle.

In an embodiment, a method for aggregating informational reports received from a plurality of vehicles is disclosed. The method may comprise receiving, from a host vehicle, an informational vehicle report. The informational vehicle report includes information identifying a detected event and a detected location of the event in an environment of the host vehicle. The method may further comprise storing the informational vehicle report in a database in association with a first cell. The first cell may be associated with a spatial region that includes the detected location. The method may then comprise querying a second cell stored in the database. The second cell may be within a predetermined distance of the first cell. The method may further comprise determining whether the second cell is associated with an information cluster associated with the detected event. When the second cell is associated with an information cluster associated with the detected event, the method may include aggregating the informational vehicle report of the first cell with the information cluster associated with the second cell to provide an aggregated cluster; generating an event report for the detected event based on information associated with the aggregated cluster; and transmitting the event report to the host vehicle. When the second cell is not associated with an information cluster associated with the detected event, the method may include generating the event report for the detected event based on the stored informational vehicle report and transmitting the event report to the host vehicle.

In an embodiment, a system for generating navigational reports for a host vehicle based on informational reports received from a plurality of vehicles is disclosed. The system may comprise at least one processing device programmed to receive a first event report from a first vehicle, the first event report relating to a detected stopped vehicle in a roadway. The first vehicle detected the stopped vehicle while approaching the stopped vehicle from a location forward of the stopped vehicle. The at least one processing device may further be programmed to receive a second event report from a second vehicle, the second event report relating to the stopped vehicle in the roadway. The second vehicle detected the stopped vehicle while approaching the stopped vehicle from a location behind the stopped vehicle. The processor may then be configured to determine, based on at least one difference between the first and second event reports, that the stopped vehicle is not part of a traffic jam; based on the determination, aggregate the first and second event reports into a clustered event report indicating that the stopped vehicle is not part of a traffic jam; generate a navigational report indicating that the stopped vehicle is not part of a traffic jam; and transmit the navigational report to the second vehicle to prompt the second vehicle to navigate around the stopped vehicle.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 2B is a diagrammatic top view representation of the vehicle and system shown in FIG. 2A consistent with the disclosed embodiments.

DETAILED DESCRIPTION

Figure 1:
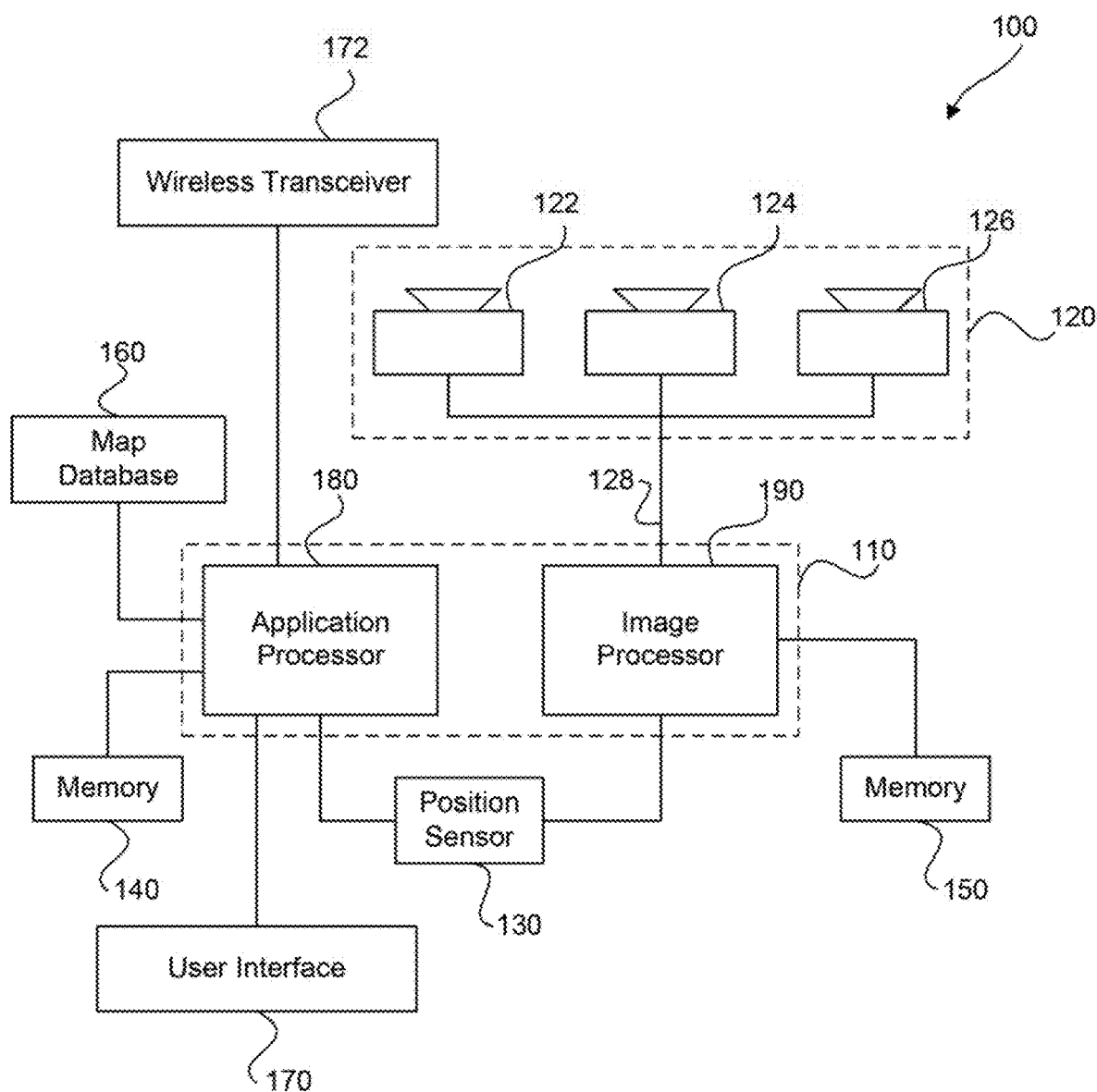
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Autonomous Vehicle Overview

As used throughout this disclosure, the term "autonomous vehicle" refers to a vehicle capable of implementing at least one navigational change without driver input. A "navigational change" refers to a change in one or more of steering, braking, or acceleration of the vehicle. To be autonomous, a vehicle need not be fully automatic (e.g., fully operation without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking). In some cases, autonomous vehicles may handle some or all aspects of braking, speed control, and/or steering of the vehicle.

As human drivers typically rely on visual cues and observations order to control a vehicle, transportation infrastructures are built accordingly, with lane markings, traffic signs, and traffic lights are all designed to provide visual information to drivers. In view of these design characteristics of transportation infrastructures, an autonomous vehicle may include a camera and a processing unit that analyzes visual information captured from the environment of the vehicle. The visual information may include, for example, components of the transportation infrastructure (e.g., lane markings, traffic signs, traffic lights, etc.) that are observable by drivers and other obstacles (e.g., other vehicles, pedestrians, debris, etc.). Additionally, an autonomous vehicle may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while the vehicle is traveling, and the vehicle (as well as other vehicles) may use the information to localize itself on the model.

In some embodiments in this disclosure, an autonomous vehicle may use information obtained while navigating (e.g., from a camera, GPS device, an accelerometer, a speed sensor, a suspension sensor, etc.). In other embodiments, an autonomous vehicle may use information obtained from past navigations by the vehicle (or by other vehicles) while navigating. In yet other embodiments, an autonomous vehicle may use a combination of information obtained while navigating and information obtained from past navigations. The following sections provide an overview of a system consistent with the disclosed embodiments, following by an overview of a forward-facing imaging system and methods consistent with the system. The sections that follow disclose systems and methods for constructing, using, and updating a sparse map for autonomous vehicle navigation.

System Overview

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, a user interface 170, and a wireless transceiver 172. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras), such as image capture device 122, image capture device 124, and image capture device 126. System 100 may also include a data interface 128 communicatively connecting processing device 110 to image acquisition device 120. For example, data interface 128 may include any wired and/or wireless link or links for transmitting image data acquired by image accusation device 120 to processing unit 110.

Wireless transceiver 172 may include one or more devices configured to exchange transmissions over an air interface to one or more networks (e.g., cellular, the Internet, etc.) by use of a radio frequency, infrared frequency, magnetic field, or an electric field. Wireless transceiver 172 may use any known standard to transmit and/or receive data (e.g., Wi-Fi, Bluetooth®, Bluetooth Smart, 802.15.4, ZigBee, etc.). Such transmissions can include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 180 and image processor 190 may include various types of processing devices. For example, either or both of applications processor 180 and image processor 190 may include a microprocessor, preprocessors (such as an image preprocessor), a graphics processing unit (GPU), a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments. In other examples, the EyeQ4® and/or the EyeQ5® may be used in the disclosed embodiments. Of course, any newer or future EyeQ processing devices may also be used together with the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware based components of a host vehicle.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices. Further, in some embodiments, system 100 may include one or more of processing unit 110 without including other components, such as image acquisition unit 120.

Processing unit 110 may comprise various types of devices. For example, processing unit 110 may include various devices, such as a controller, an image preprocessor, a central processing unit (CPU), a graphics processing unit (GPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The GPU may also comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software, as well as a trained system, such as a neural network, or a deep neural network, for example. The memory units may include random access memory (RAM), read only memory (ROM), flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

In some embodiments, system 100 may include components such as a speed sensor (e.g., a tachometer, a speedometer) for measuring a speed of vehicle 200 and/or an accelerometer (either single axis or multiaxis) for measuring acceleration of vehicle 200.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.). In some cases, map database 160 may store a sparse data model including polynomial representations of certain road features (e.g., lane markings) or target trajectories for the host vehicle. Systems and methods of generating such a map are discussed below with references to FIGS. 8-19.

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

Figure 2A:
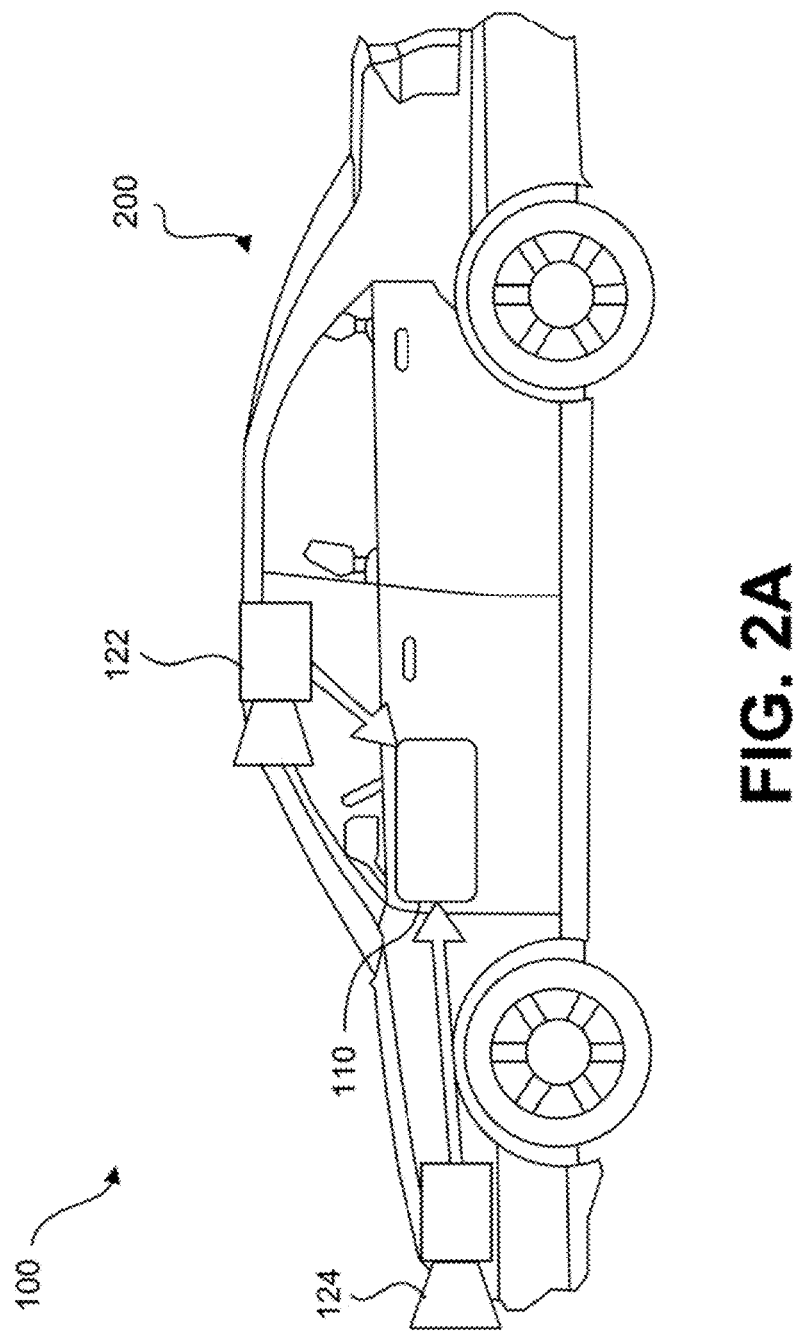
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

As discussed earlier, wireless transceiver 172 may and/or receive data over one or more networks (e.g., cellular networks, the Internet, etc.). For example, wireless transceiver 172 may upload data collected by system 100 to one or more servers, and download data from the one or more servers. Via wireless transceiver 172, system 100 may receive, for example, periodic or on demand updates to data stored in map database 160, memory 140, and/or memory 150. Similarly, wireless transceiver 172 may upload any data (e.g., images captured by image acquisition unit 120, data received by position sensor 130 or other sensors, vehicle control systems, etc.) from by system 100 and/or any data processed by processing unit 110 to the one or more servers.

System 100 may upload data to a server (e.g., to the cloud) based on a privacy level setting. For example, system 100 may implement privacy level settings to regulate or limit the types of data (including metadata) sent to the server that may uniquely identify a vehicle and or driver/owner of a vehicle. Such settings may be set by user via, for example, wireless transceiver 172, be initialized by factory default settings, or by data received by wireless transceiver 172.

In some embodiments, system 100 may upload data according to a "high" privacy level, and under setting a setting, system 100 may transmit data (e.g., location information related to a route, captured images, etc.) without any details about the specific vehicle and/or driver/owner. For example, when uploading data according to a "high" privacy setting, system 100 may not include a vehicle identification number (VIN) or a name of a driver or owner of the vehicle, and may instead of transmit data, such as captured images and/or limited location information related to a route.

Other privacy levels are contemplated. For example, system 100 may transmit data to a server according to an "intermediate" privacy level and include additional information not included under a "high" privacy level, such as a make and/or model of a vehicle and/or a vehicle type (e.g., a passenger vehicle, sport utility vehicle, truck, etc.). In some embodiments, system 100 may upload data according to a "low" privacy level. Under a "low" privacy level setting, system 100 may upload data and include information sufficient to uniquely identify a specific vehicle, owner/driver, and/or a portion or entirely of a route traveled by the vehicle. Such "low" privacy level data may include one or more of, for example, a VIN, a driver/owner name, an origination point of a vehicle prior to departure, an intended destination of the vehicle, a make and/or model of the vehicle, a type of the vehicle, etc.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
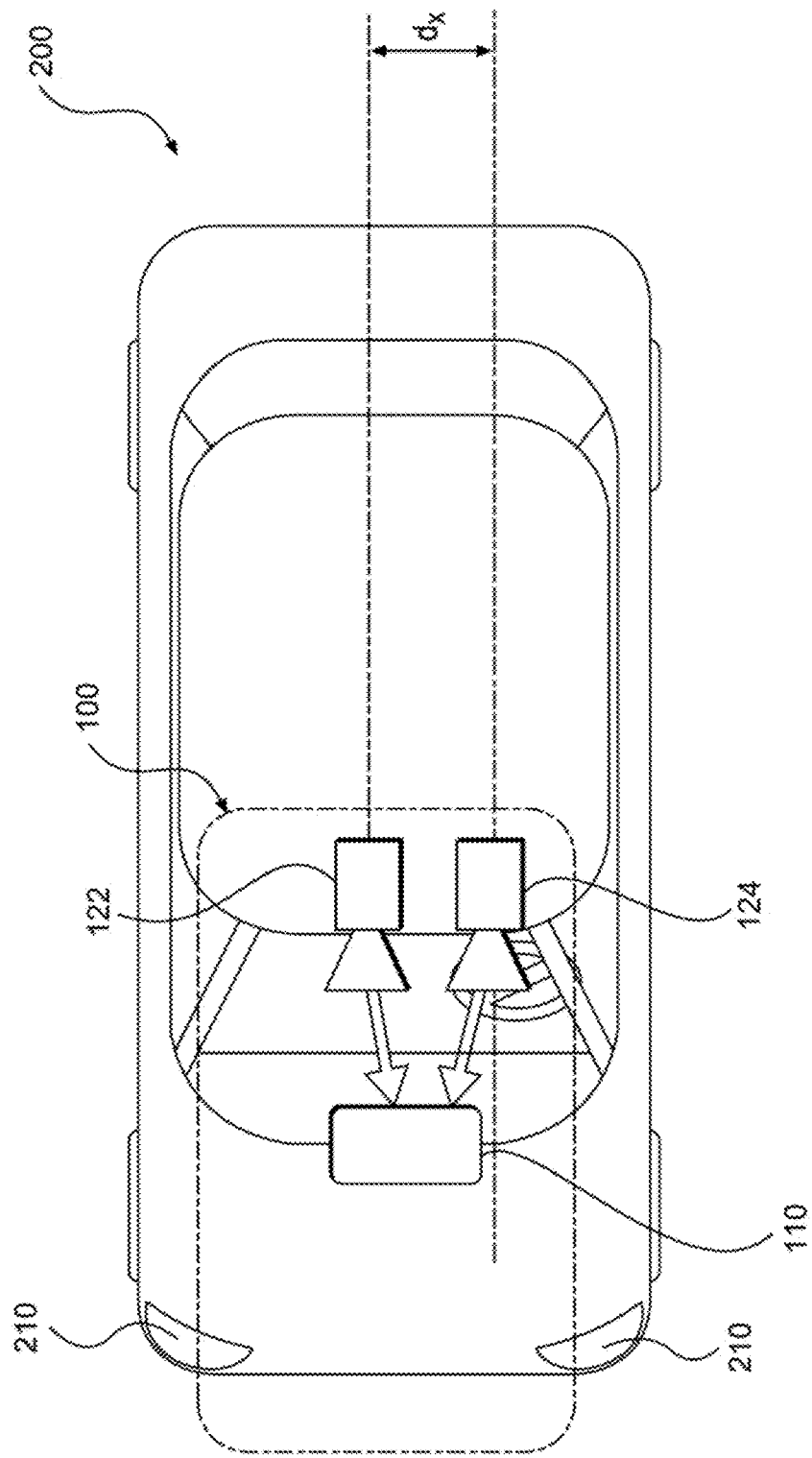
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
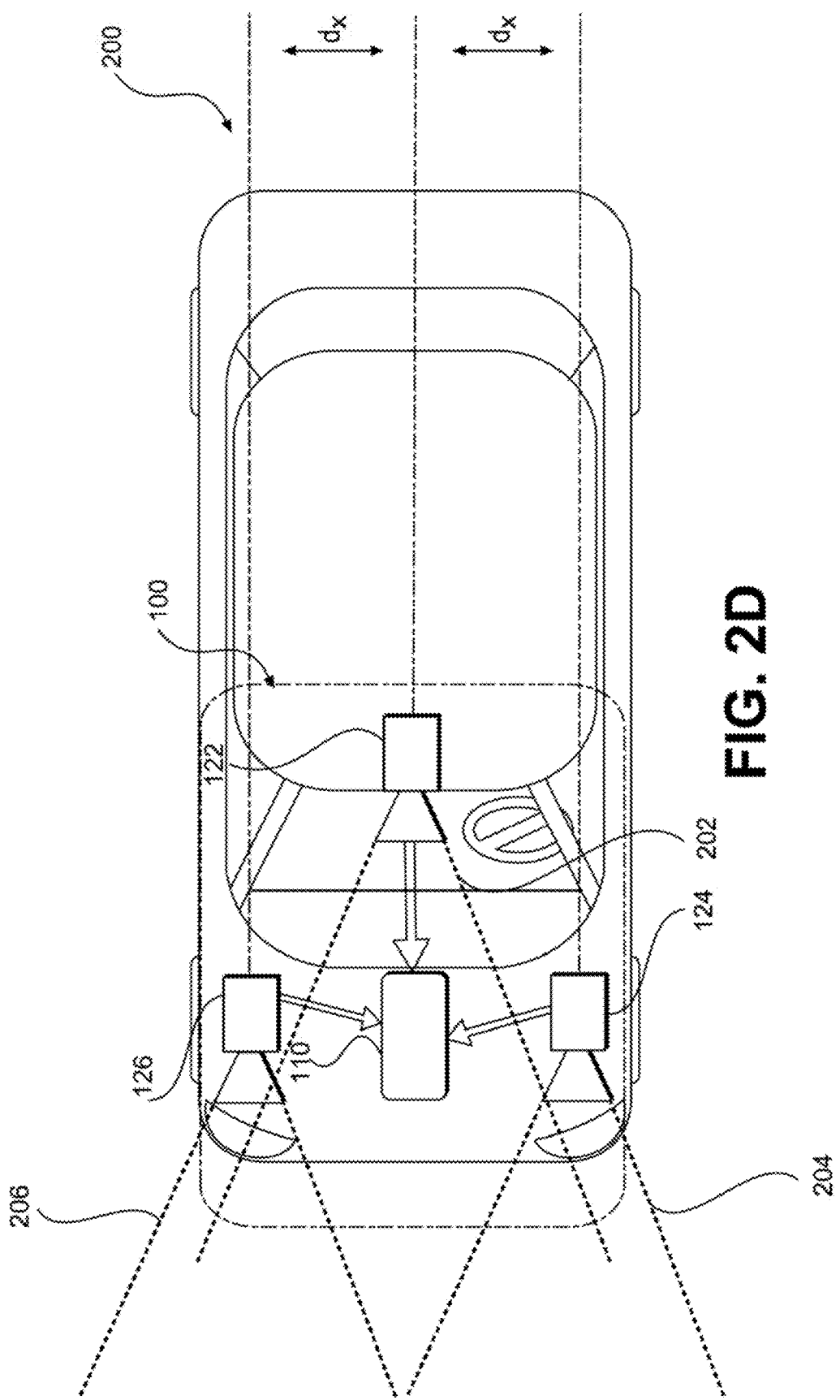
FIG. 2D is a diagrammatic top view representation of yet another embodiment of a vehicle including a system consistent with the disclosed embodiments.
Figure 2E:
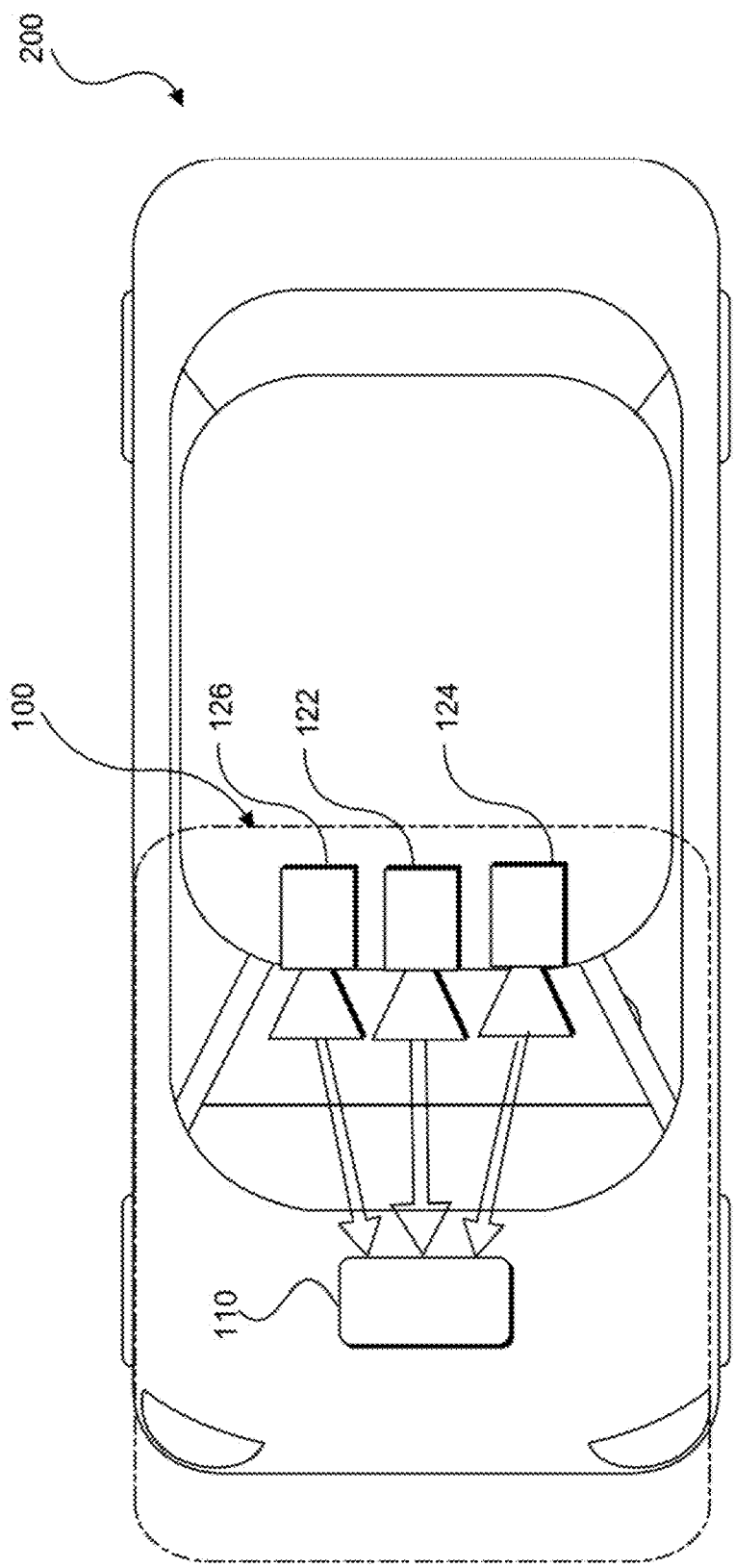
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV. In some embodiments, image capture device 122 may be a 7.2M pixel image capture device with an aspect ratio of about 2:1 (e.g., H×V=3800×1900 pixels) with about 100 degree horizontal FOV. Such an image capture device may be used in place of a three image capture device configuration. Due to significant lens distortion, the vertical FOV of such an image capture device may be significantly less than 50 degrees in implementations in which the image capture device uses a radially symmetric lens. For example, such a lens may not be radially symmetric which would allow for a vertical FOV greater than 50 degrees with 100 degree horizontal FOV.

The first image capture device 122 may acquire a plurality of first images relative to a scene associated with the vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

In some embodiments, one or more of the image capture devices (e.g., image capture devices 122, 124, and 126) disclosed herein may constitute a high resolution imager and may have a resolution greater than 5M pixel, 7M pixel, 10M pixel, or greater.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with the vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by $d_x$, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280× 960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640 x 480 and another device includes an image sensor with a resolution of 1280 x 960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
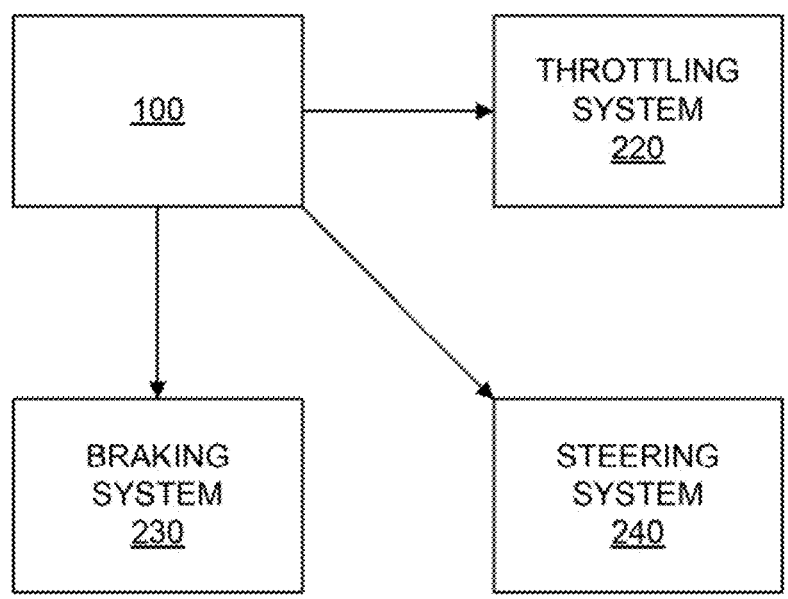
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
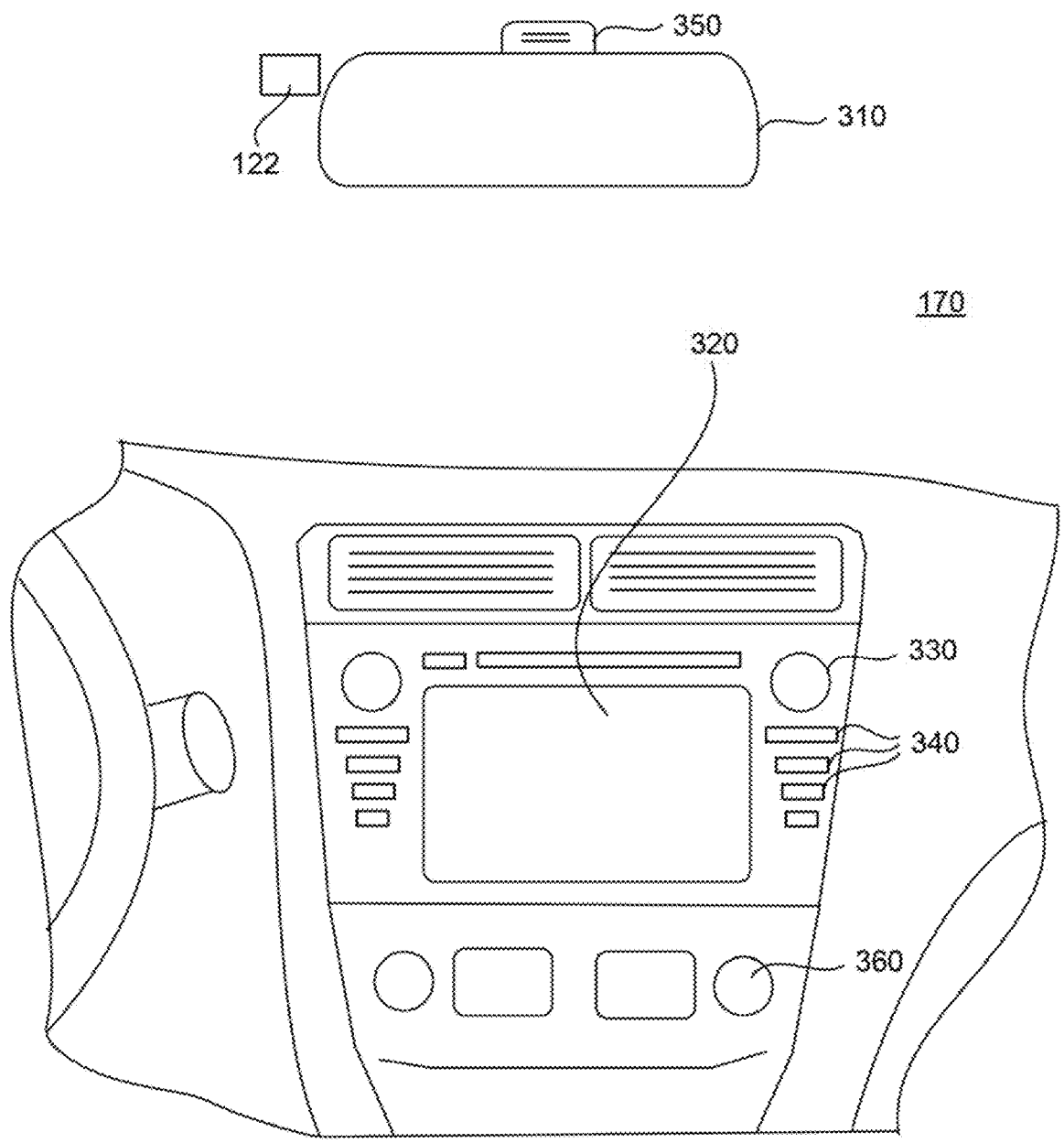
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
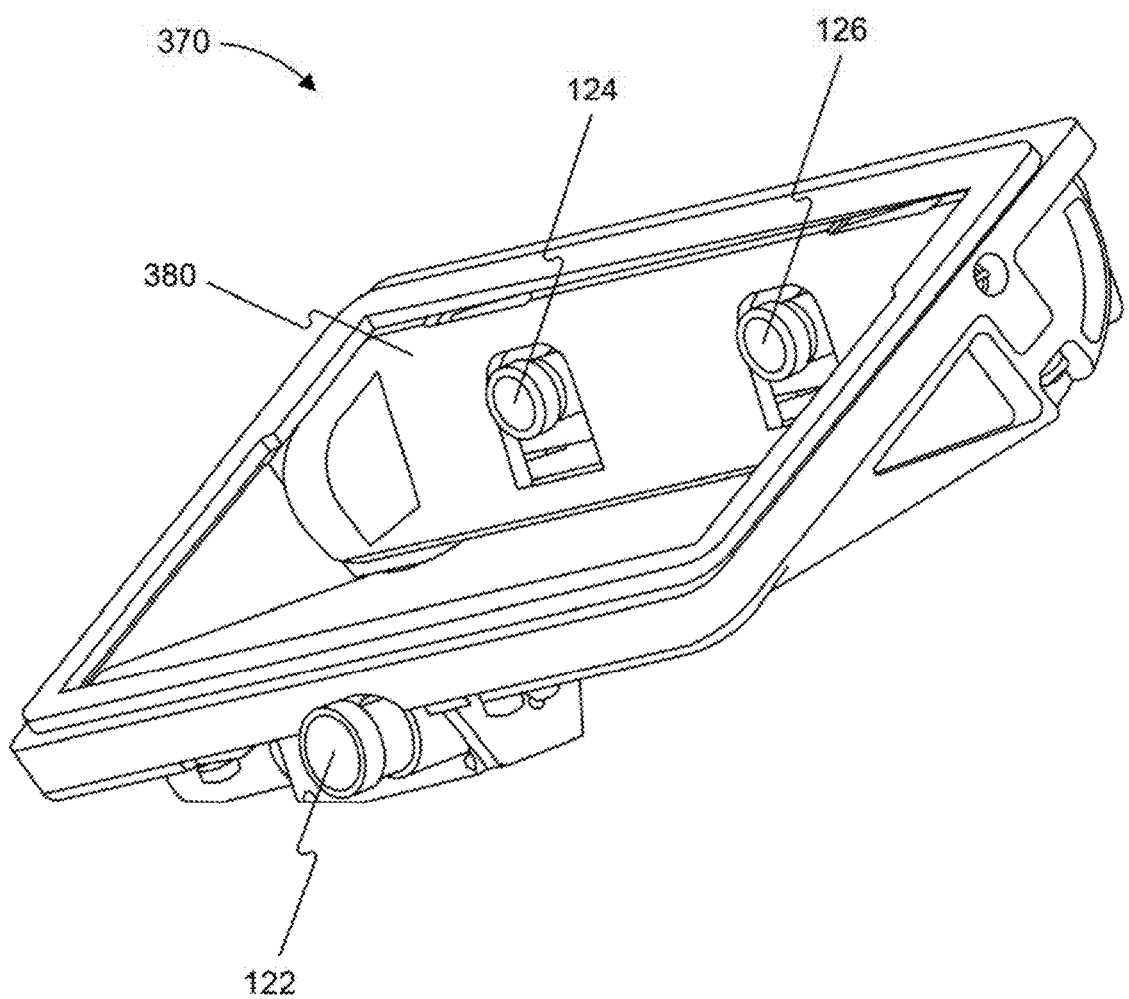
FIG. 3B is an illustration of an example of a camera mount that is configured to be positioned behind a rearview mirror and against a vehicle windshield consistent with the disclosed embodiments.
Figure 3C:
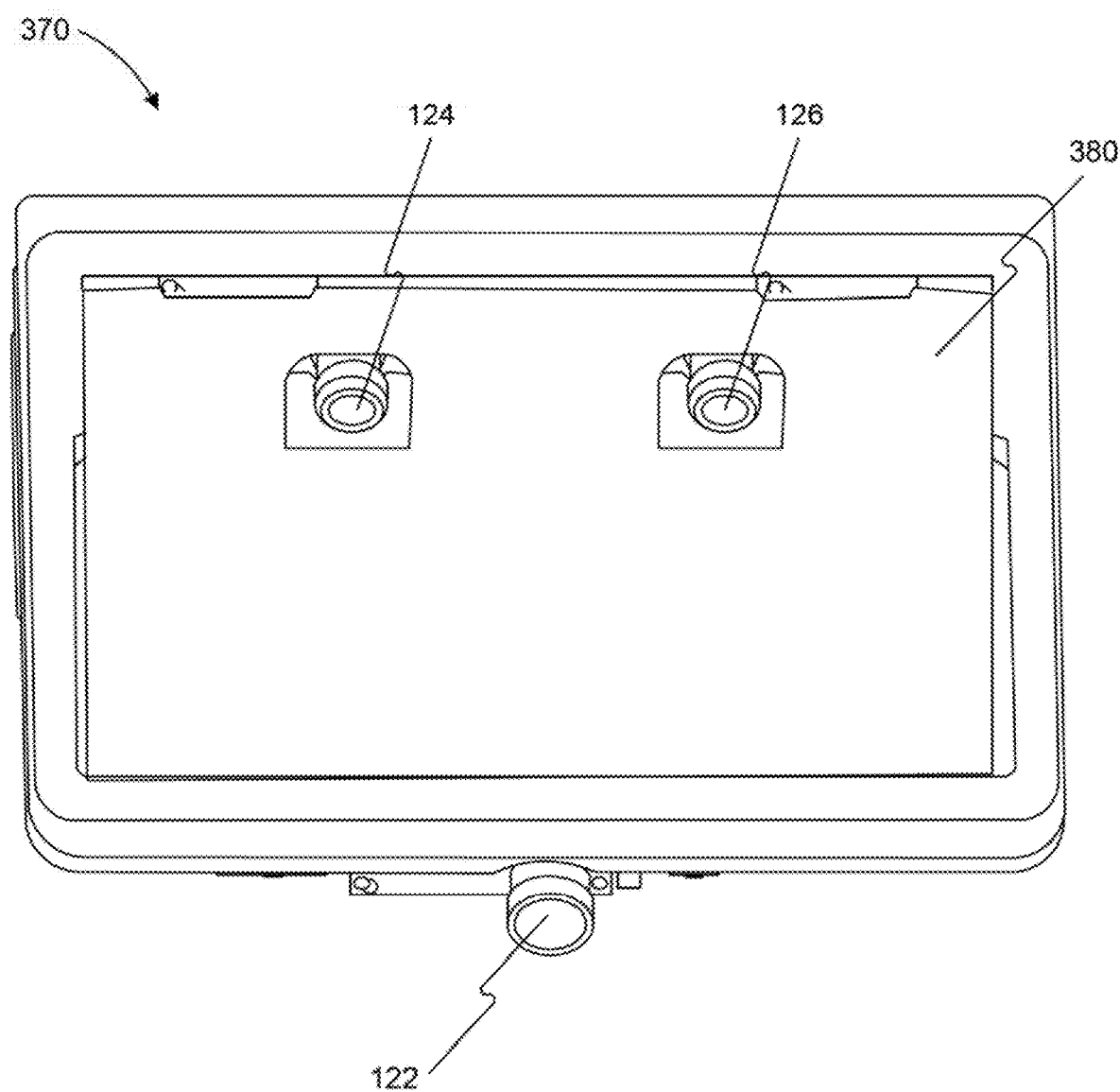
FIG. 3C is an illustration of the camera mount shown in FIG. 3B from a different perspective consistent with the disclosed embodiments.
Figure 3D:
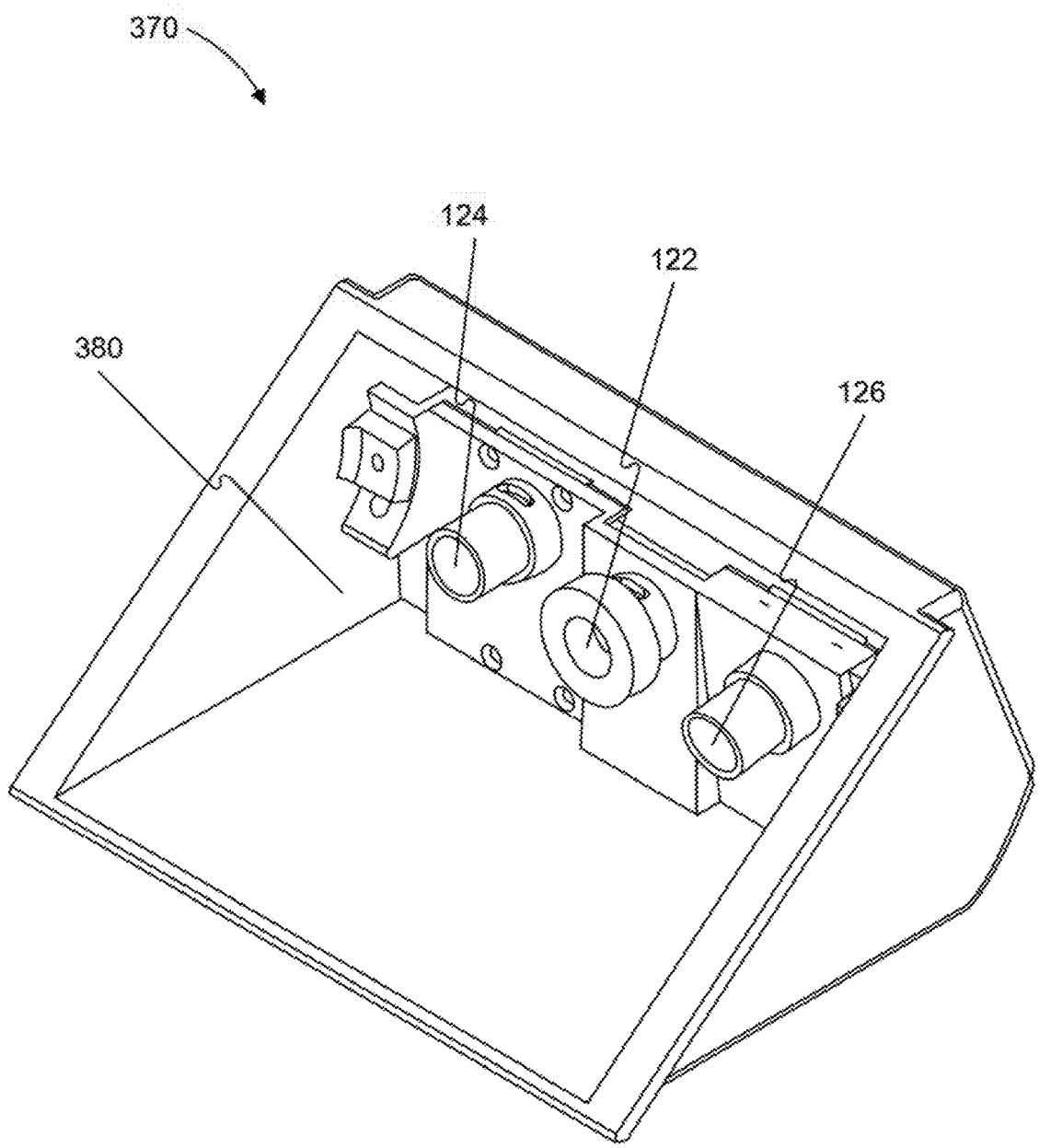
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that the shield aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122, 124, and 126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122, 124, and 126 may be positioned behind rearview mirror 310 and positioned substantially side-by-side (e.g., 6 cm apart). Further, in some embodiments, as discussed above, one or more of image capture devices 122, 124, and 126 may be mounted behind glare shield 380 that is flush with the windshield of vehicle 200. Such shielding may act to minimize the impact of any reflections from inside the car on image capture devices 122, 124, and 126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122, 124, and 126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system). Furthermore, in some embodiments, redundancy and validation of received data may be supplemented based on information received from one more sensors (e.g., radar, lidar, acoustic sensors, information received from one or more transceivers outside of a vehicle, etc.).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
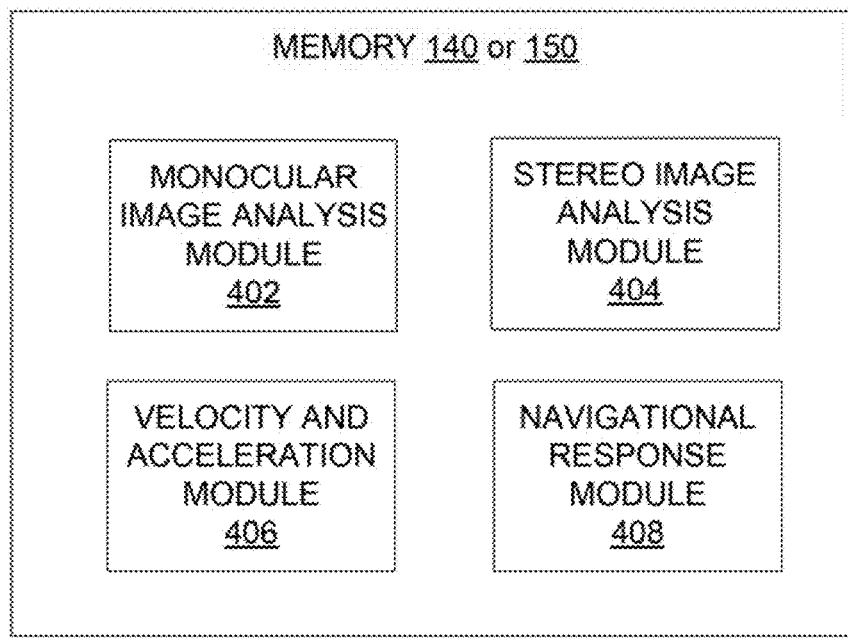
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, application processor 180 and/or image processor 190 may execute the instructions stored in any of modules 402, 404, 406, and 408 included in memory 140. One of skill in the art will understand that references in the following discussions to processing unit 110 may refer to application processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar, lidar, etc.) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408. Furthermore, in some embodiments, stereo image analysis module 404 may implement techniques associated with a trained system (such as a neural network or a deep neural network) or an untrained system, such as a system that may be configured to use computer vision algorithms to detect and/or label objects in an environment from which sensory information was captured and processed. In one embodiment, stereo image analysis module 404 and/or other image processing modules may be configured to use a combination of a trained and untrained system.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Furthermore, any of the modules (e.g., modules 402, 404, and 406) disclosed herein may implement techniques associated with a trained system (such as a neural network or a deep neural network) or an untrained system.

Figure 5A:
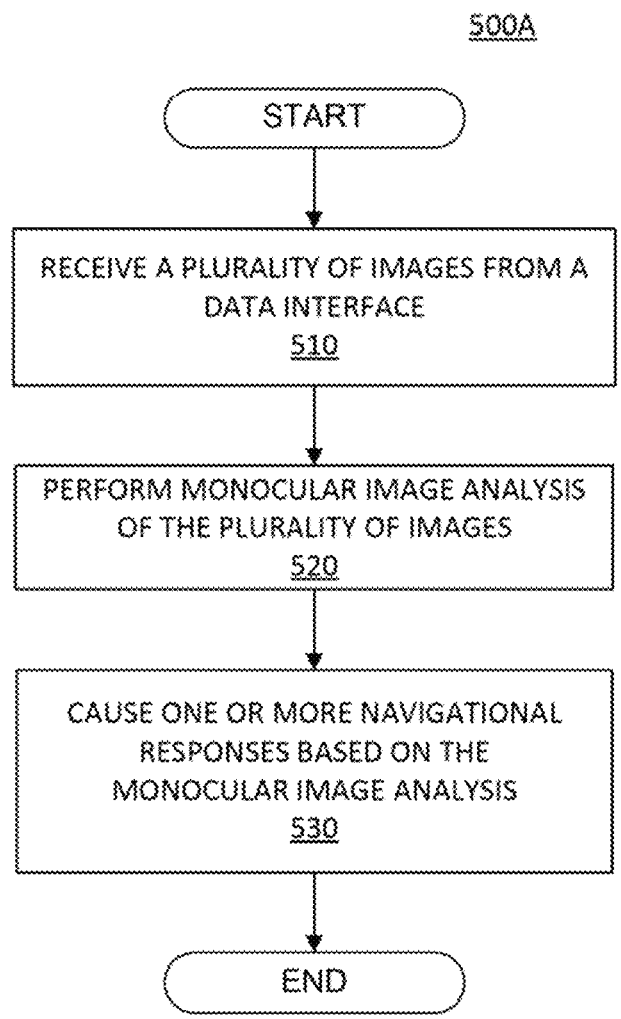
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
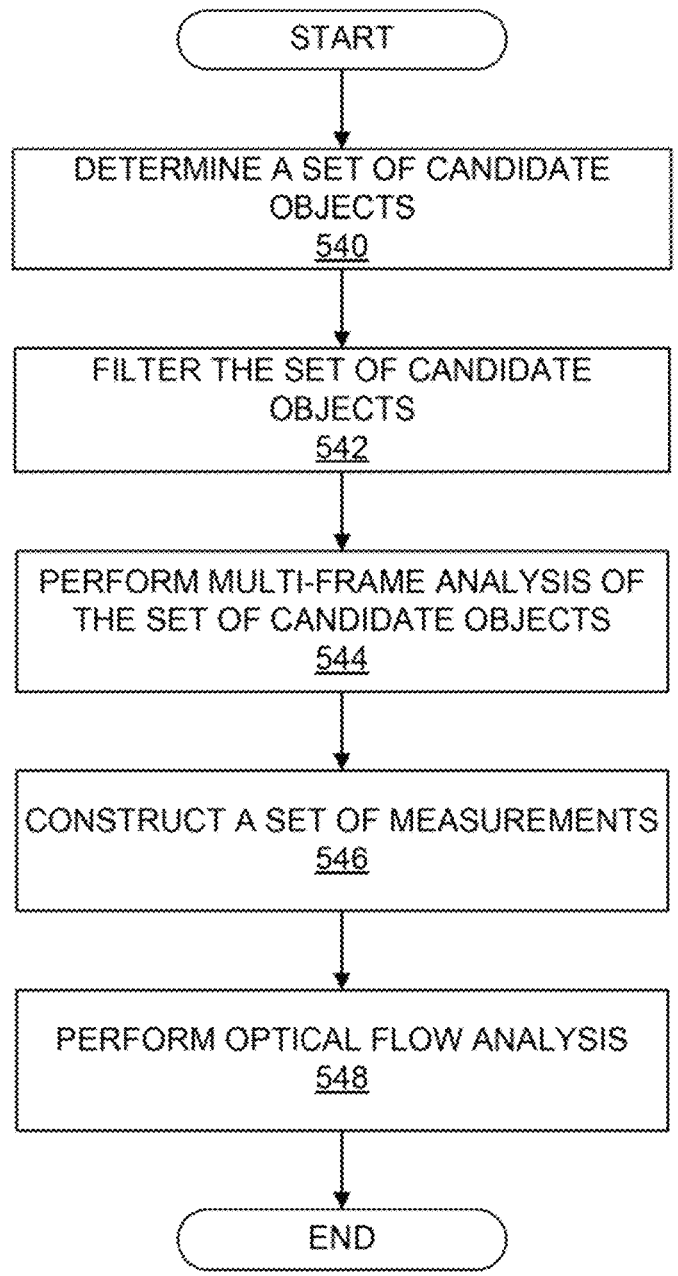
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
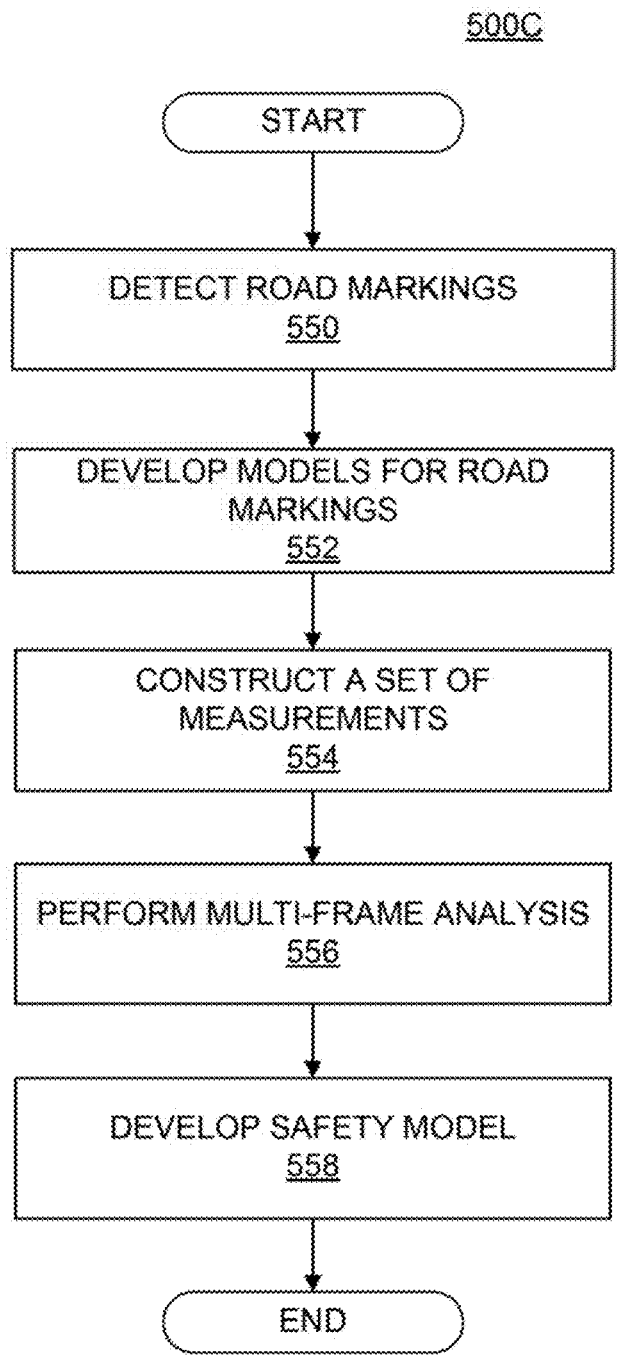
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550, 552, 554, and 556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
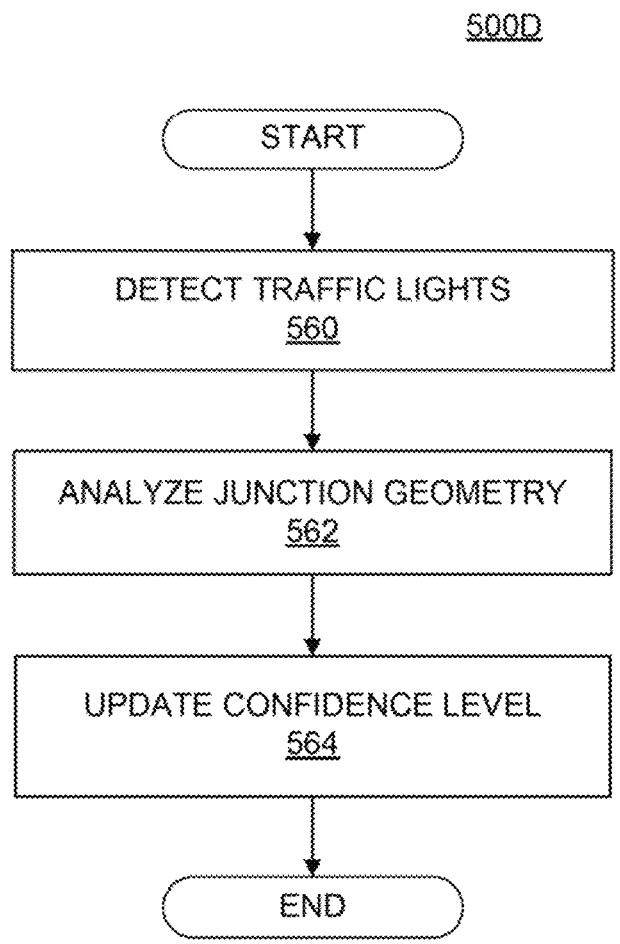
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560, 562, and 564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
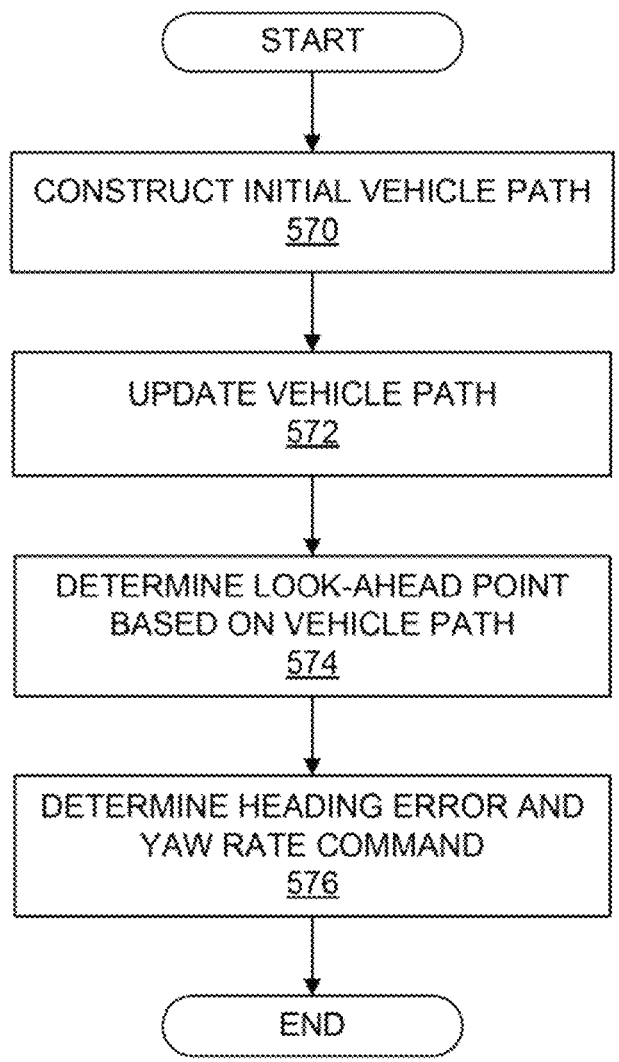
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance $d_i$ between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_1, z_1)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the-arctangent of the look-ahead point, e.g., arctan $(x_1/z_1)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
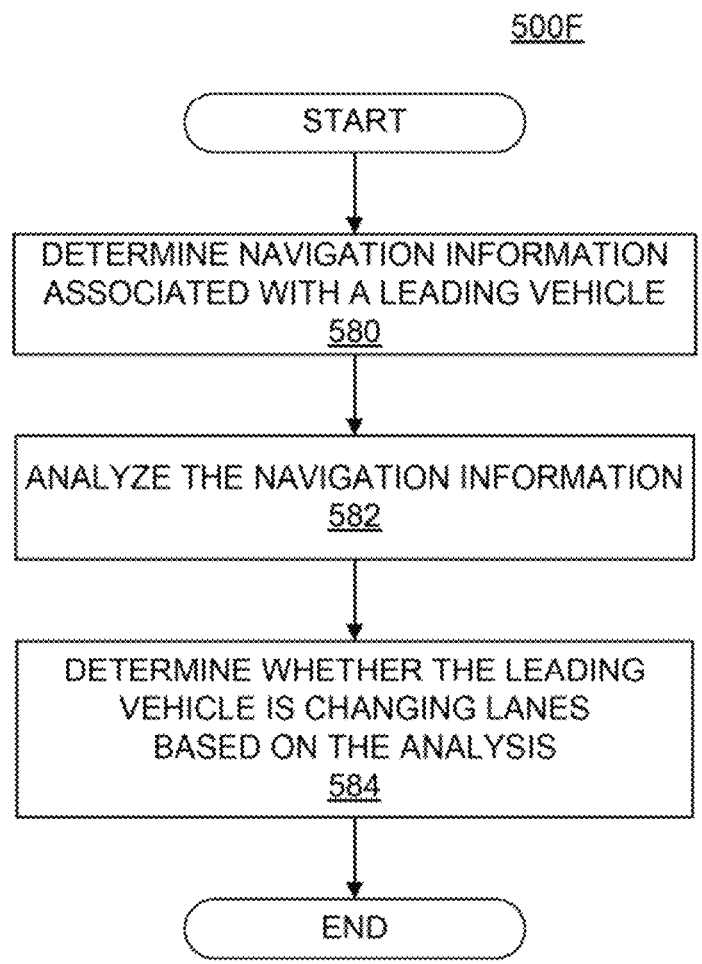
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2 + \delta_x^2)/2/(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the ease where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights.

Figure 6:
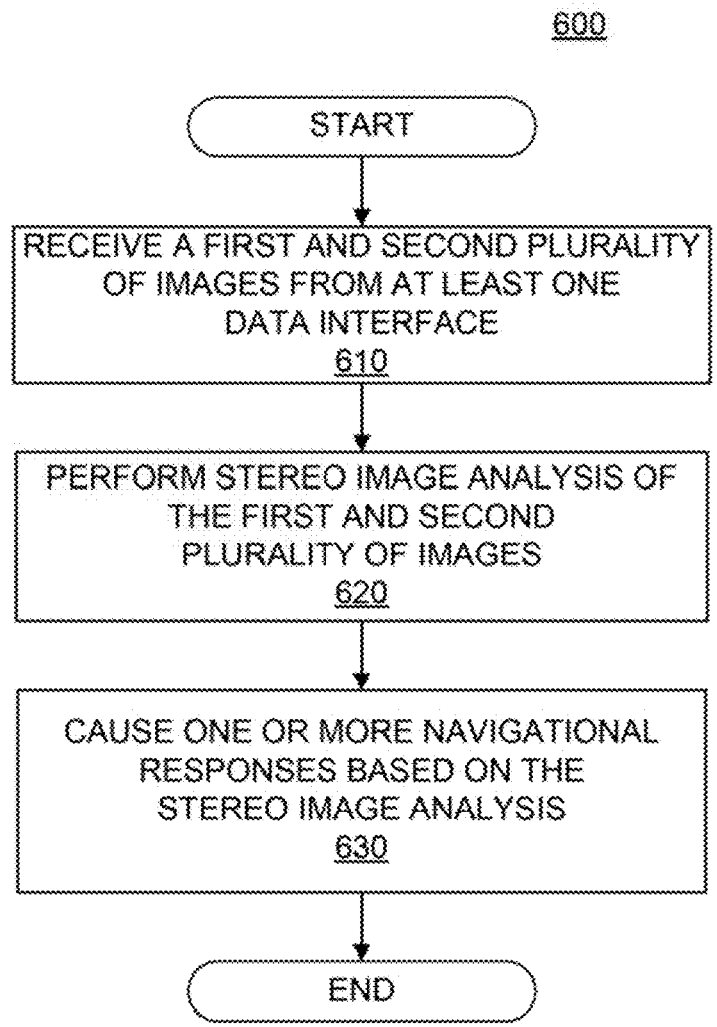
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing if the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
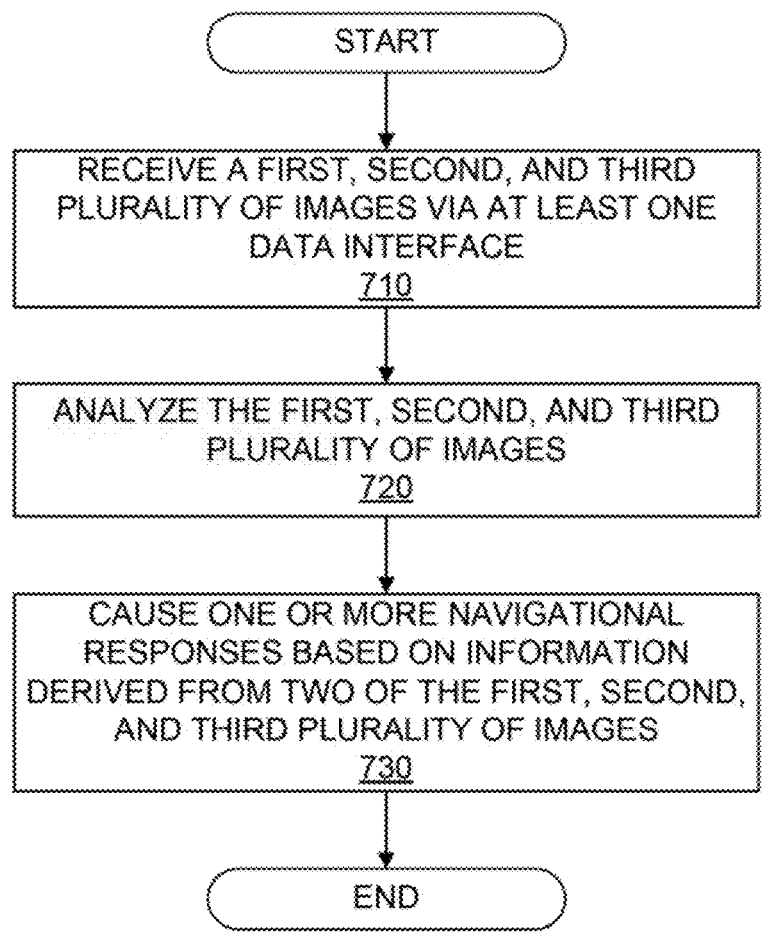
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126—including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Analysis of captured images may allow for the generation and use of a sparse map model for autonomous vehicle navigation. In addition, analysis of captured images may allow for the localization of an autonomous vehicle using identified lane markings. Embodiments for detection of particular characteristics based on one or more particular analyses of captured images and for navigation of an autonomous vehicle using a sparse map model will be discussed below.

Sparse Road Model for Autonomous Vehicle Navigation

In some embodiments, the disclosed systems and methods may use a sparse map for autonomous vehicle navigation. In particular, the sparse map may be for autonomous vehicle navigation along a road segment. For example, the sparse map may provide sufficient information for navigating an autonomous vehicle without storing and/or updating a large quantity of data. As discussed below in further detail, an autonomous vehicle may use the sparse map to navigate one or more roads based on one or more stored trajectories.

Sparse Map for Autonomous Vehicle Navigation

In some embodiments, the disclosed systems and methods may generate a sparse map for autonomous vehicle navigation. For example, the sparse map may provide sufficient information for navigation without requiring excessive data storage or data transfer rates. As discussed below in further detail, a vehicle (which may be an autonomous vehicle) may use the sparse map to navigate one or more roads. For example, in some embodiments, the sparse map may include data related to a road and potentially landmarks along the road that may be sufficient for vehicle navigation, but which also exhibit small data footprints. For example, the sparse data maps described in detail below may require significantly less storage space and data transfer bandwidth as compared with digital maps including detailed map information, such as image data collected along a road.

For example, rather than storing detailed representations of a road segment, the sparse data map may store three-dimensional polynomial representations of preferred vehicle paths along a road. These paths may require very little data storage space. Further, in the described sparse data maps, landmarks may be identified and included in the sparse map road model to aid in navigation. These landmarks may be located at any spacing suitable for enabling vehicle navigation, but in some cases, such landmarks need not be identified and included in the model at high densities and short spacings. Rather, in some cases, navigation may be possible based on landmarks that are spaced apart by at least 50 meters, at least 100 meters, at least 500 meters, at least 1 kilometer, or at least 2 kilometers. As will be discussed in more detail in other sections, the sparse map may be generated based on data collected or measured by vehicles equipped with various sensors and devices, such as image capture devices, Global Positioning system sensors, motion sensors, etc., as the vehicles travel along roadways. In some cases, the sparse map may be generated based on data collected during multiple drives of one or more vehicles along a particular roadway. Generating a sparse map using multiple drives of one or more vehicles may be referred to as "crowdsourcing" a sparse map.

Consistent with disclosed embodiments, an autonomous vehicle system may use a sparse map for navigation. For example, the disclosed systems and methods may distribute a sparse map for generating a road navigation model for an autonomous vehicle and may navigate an autonomous vehicle along a road segment using a sparse map and/or a generated road navigation model. Sparse maps consistent with the present disclosure may include one or more three-dimensional contours that may represent predetermined trajectories that autonomous vehicles may traverse as they move along associated road segments.

Sparse maps consistent with the present disclosure may also include data representing one or more road features. Such road features may include recognized landmarks, road signature profiles, and any other road-related features useful in navigating a vehicle. Sparse maps consistent with the present disclosure may enable autonomous navigation of a vehicle based on relatively small amounts of data included in the sparse map. For example, rather than including detailed representations of a road, such as road edges, road curvature, images associated with road segments, or data detailing other physical features associated with a road segment, the disclosed embodiments of the sparse map may require relatively little storage space (and relatively little bandwidth when portions of the sparse map are transferred to a vehicle) but may still adequately provide for autonomous vehicle navigation. The small data footprint of the disclosed sparse maps, discussed in further detail below, may be achieved in some embodiments by storing representations of road-related elements that require small amounts of data but still enable autonomous navigation.

For example, rather than storing detailed representations of various aspects of a road, the disclosed sparse maps may store polynomial representations of one or more trajectories that a vehicle may follow along the road. Thus, rather than storing (or having to transfer) details regarding the physical nature of the road to enable navigation along the road, using the disclosed sparse maps, a vehicle may be navigated along a particular road segment without, in some cases, having to interpret physical aspects of the road, but rather, by aligning its path of travel with a trajectory (e.g., a polynomial spline) along the particular road segment. In this way, the vehicle may be navigated based mainly upon the stored trajectory (e.g., a polynomial spline) that may require much less storage space than an approach involving storage of roadway images, road parameters, road layout, etc.

In addition to the stored polynomial representations of trajectories along a road segment, the disclosed sparse maps may also include small data objects that may represent a road feature. In some embodiments, the small data objects may include digital signatures, which are derived from a digital image (or a digital signal) that was obtained by a sensor (e.g., a camera or other sensor, such as a suspension sensor) onboard a vehicle traveling along the road segment. The digital signature may have a reduced size relative to the signal that was acquired by the sensor. In some embodiments, the digital signature may be created to be compatible with a classifier function that is configured to detect and to identify the road feature from the signal that is acquired by the sensor, for example, during a subsequent drive. In some embodiments, a digital signature may be created such that the digital signature has a footprint that is as small as possible, while retaining the ability to correlate or match the road feature with the stored signature based on an image (or a digital signal generated by a sensor, if the stored signature is not based on an image and/or includes other data) of the road feature that is captured by a camera onboard a vehicle traveling along the same road segment at a subsequent time.

In some embodiments, a size of the data objects may be further associated with a uniqueness of the road feature. For example, for a road feature that is detectable by a camera onboard a vehicle, and where the camera system onboard the vehicle is coupled to a classifier that is capable of distinguishing the image data corresponding to that road feature as being associated with a particular type of road feature, for example, a road sign, and where such a road sign is locally unique in that area (e.g., there is no identical road sign or road sign of the same type nearby), it may be sufficient to store data indicating the type of the road feature and its location.

As will be discussed in further detail below, road features (e.g., landmarks along a road segment) may be stored as small data objects that may represent a road feature in relatively few bytes, while at the same time providing sufficient information for recognizing and using such a feature for navigation. In one example, a road sign may be identified as a recognized landmark on which navigation of a vehicle may be based. A representation of the road sign may be stored in the sparse map to include, e.g., a few bytes of data indicating a type of landmark (e.g., a stop sign) and a few bytes of data indicating a location of the landmark (e.g., coordinates). Navigating based on such data-light representations of the landmarks (e.g., using representations sufficient for locating, recognizing, and navigating based upon the landmarks) may provide a desired level of navigational functionality associated with sparse maps without significantly increasing the data overhead associated with the sparse maps. This lean representation of landmarks (and other road features) may take advantage of the sensors and processors included onboard such vehicles that are configured to detect, identify, and/or classify certain road features.

When, for example, a sign or even a particular type of a sign is locally unique (e.g., when there is no other sign or no other sign of the same type) in a given area, the sparse map may use data indicating a type of a landmark (a sign or a specific type of sign), and during navigation (e.g., autonomous navigation) when a camera onboard an autonomous vehicle captures an image of the area including a sign (or of a specific type of sign), the processor may process the image, detect the sign (if indeed present in the image), classify the image as a sign (or as a specific type of sign), and correlate the location of the image with the location of the sign as stored in the sparse map.

Road Feature Representation

In some embodiments, a sparse map may include at least one line representation of a road surface feature extending along a road segment and a plurality of landmarks associated with the road segment. In certain aspects, the sparse map may be generated via "crowdsourcing," for example, through image analysis of a plurality of images acquired as one or more vehicles traverse the road segment.

Figure 8A:
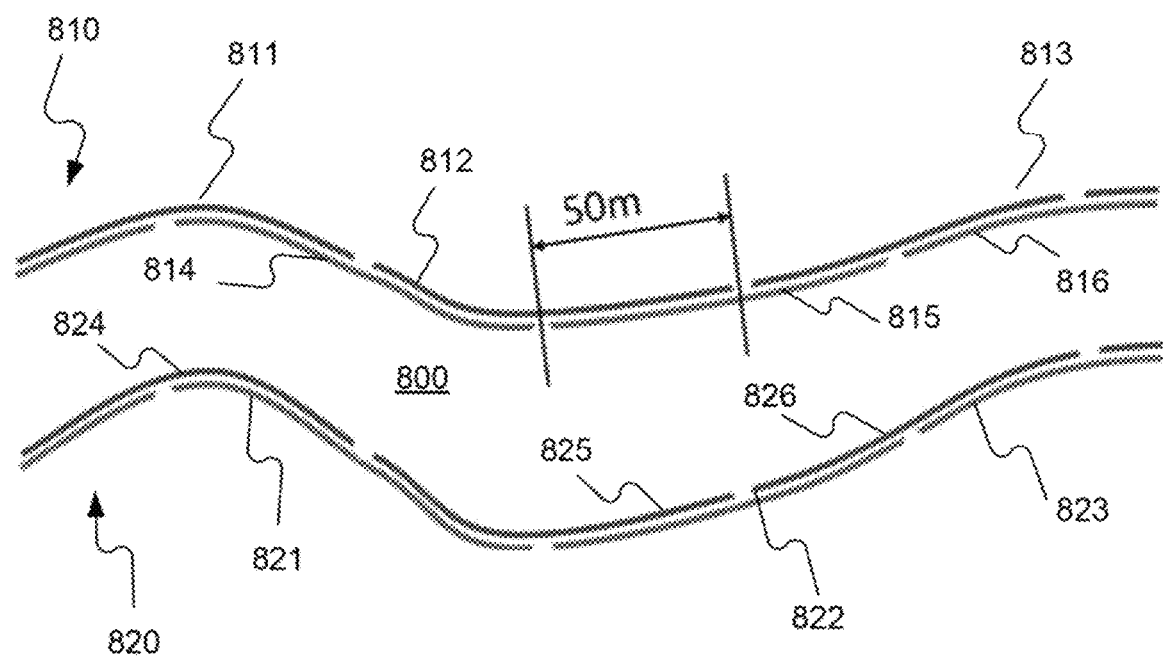
FIG. 8A illustrates a polynomial representation of a portions of a road segment consistent with the disclosed embodiments.
Figure 9A:
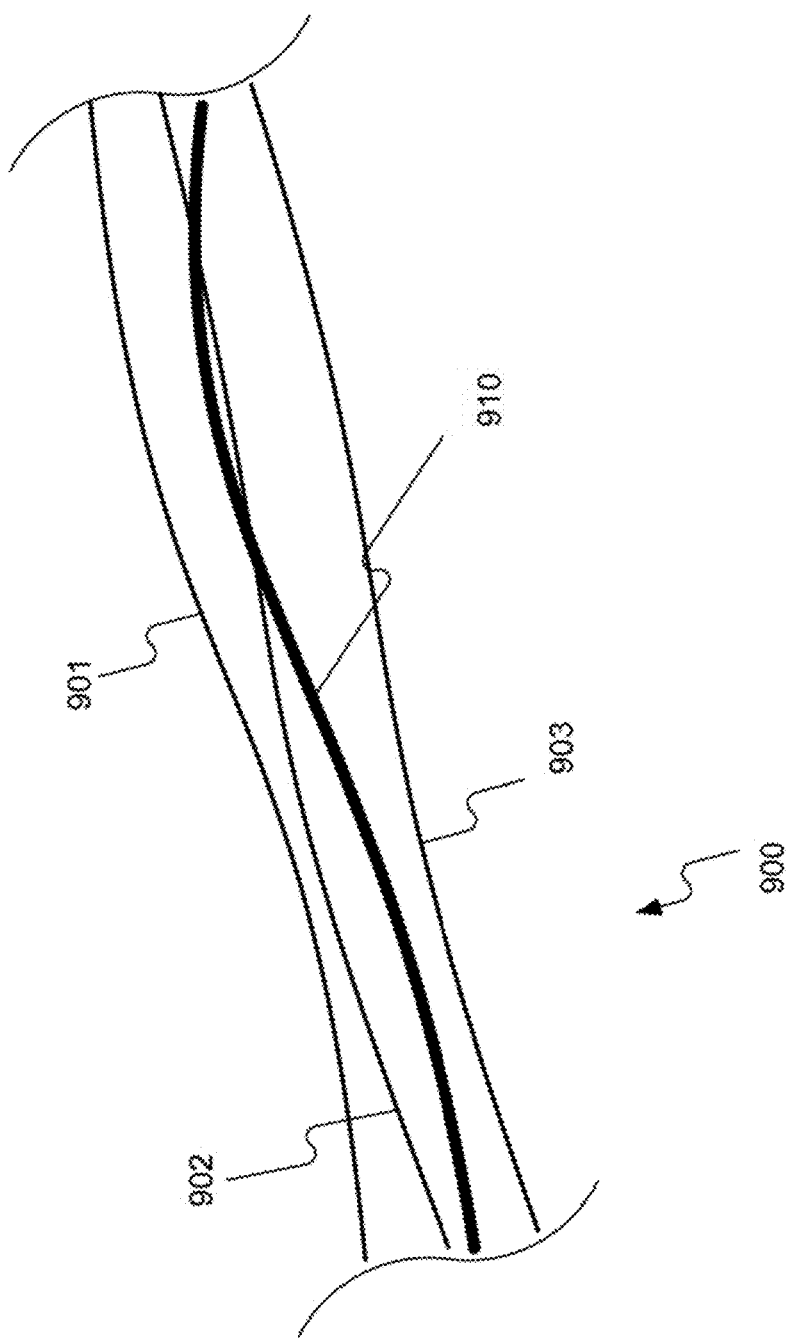
FIG. 9A shows polynomial representations of trajectories consistent with the disclosed embodiments.

In addition to target trajectories and identified landmarks, a sparse may include information relating to various other road features. For example, FIG. 9A illustrates a representation of curves along a particular road segment that may be stored in a sparse map. In some embodiments, a single lane of a road may be modeled by a three-dimensional polynomial description of left and right sides of the road. Such polynomials representing left and right sides of a single lane are shown in FIG. 8A. Regardless of how many lanes a road may have, the road may be represented using polynomials in a way similar to that illustrated in FIG. 8A. For example, left and right sides of a multi-lane road may be represented by polynomials similar to those shown in FIG. 8A, and intermediate lane markings included on a multi-lane road (e.g., dashed markings representing lane boundaries, solid yellow lines representing boundaries between lanes traveling in different directions, etc.) may also be represented using polynomials such as those shown in FIG. 8A.

As shown in FIG. 8A, a lane 800 may be represented using polynomials (e.g., a first order, second order, third order, or any suitable order polynomials). For illustration, lane 800 is shown as a two-dimensional lane and the polynomials are shown as two-dimensional polynomials. As depicted in FIG. 8A, lane 800 includes a left side 810 and a right side 820. In some embodiments, more than one polynomial may be used to represent a location of each side of the road or lane boundary. For example, each of left side 810 and right side 820 may be represented by a plurality of polynomials of any suitable length. In some cases, the polynomials may have a length of about 100 m, although other lengths greater than or less than 100 m may also be used. Additionally, the polynomials can overlap with one another in order to facilitate seamless transitions in navigating based on subsequently encountered polynomials as a host vehicle travels along a roadway. For example, each of left side 810 and right side 820 may be represented by a plurality of third order polynomials separated into segments of about 100 meters in length (an example of the first predetermined range), and overlapping each other by about 50 meters. The polynomials representing the left side 810 and the right side 820 may or may not have the same order. For example, in some embodiments, some polynomials may be second order polynomials, some may be third order polynomials, and some may be fourth order polynomials.

In the example shown in FIG. 8A, left side 810 of lane 800 is represented by two groups of third order polynomials. The first group includes polynomial segments 811, 812, and 813. The second group includes polynomial segments 814, 815, and 816. The two groups, while substantially parallel to each other, follow the locations of their respective sides of the road. Polynomial segments 811, 812, 813, 814, 815, and 816 have a length of about 100 meters and overlap adjacent segments in the series by about 50 meters. As noted previously, however, polynomials of different lengths and different overlap amounts may also be used. For example, the polynomials may have lengths of 500 m, 1 km, or more, and the overlap amount may vary from 0 to 50 m, 50 m to 100 m, or greater than 100 m. Additionally, while FIG. 8A is shown as representing polynomials extending in 2D space (e.g., on the surface of the paper), it is to be understood that these polynomials may represent curves extending in three dimensions (e.g., including a height component) to represent elevation changes in a road segment in addition to X-Y curvature. In the example shown in FIG. 8A, right side 820 of lane 800 is further represented by a first group having polynomial segments 821, 822, and 823 and a second group having polynomial segments 824, 825, and 826.

Figure 8B:
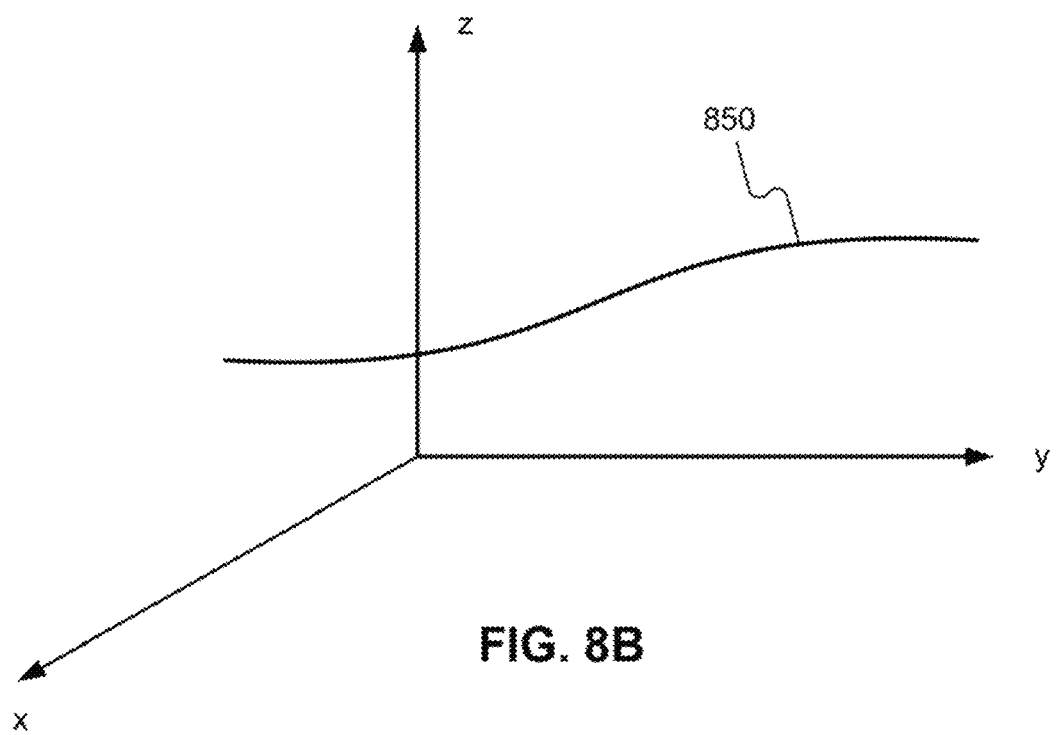
FIG. 8B illustrates a curve in three-dimensional space representing a target trajectory of a vehicle, for a particular road segment, included in a sparse map consistent with the disclosed embodiments.

Returning to the target trajectories of a sparse map, FIG. 8B shows a three-dimensional polynomial representing a target trajectory for a vehicle traveling along a particular road segment. The target trajectory represents not only the X-Y path that a host vehicle should travel along a particular road segment, but also the elevation change that the host vehicle will experience when traveling along the road segment. Thus, each target trajectory in a sparse map may be represented by one or more three-dimensional polynomials, like the three-dimensional polynomial 850 shown in FIG. 8B. A sparse map may include a plurality of trajectories (e.g., millions or billions or more to represent trajectories of vehicles along various road segments along roadways throughout the world). In some embodiments, each target trajectory may correspond to a spline connecting three-dimensional polynomial segments.

Regarding the data footprint of polynomial curves stored in a sparse map, in some embodiments, each third degree polynomial may be represented by four parameters, each requiring four bytes of data. Suitable representations may be obtained with third degree polynomials requiring about 192 bytes of data for every 100 m. This may translate to approximately 200 kB per hour in data usage/transfer requirements for a host vehicle traveling approximately 100 km/hr.

A sparse map may describe the lanes network using a combination of geometry descriptors and meta-data. The geometry may be described by polynomials or splines as described above. The meta-data may describe the number of lanes, special characteristics (such as a car pool lane), and possibly other sparse labels. The total footprint of such indicators may be negligible.

Accordingly, a sparse map according to embodiments of the present disclosure may include at least one line representation of a road surface feature extending along the road segment, each line representation representing a path along the road segment substantially corresponding with the road surface feature. In some embodiments, as discussed above, the at least one line representation of the road surface feature may include a spline, a polynomial representation, or a curve. Furthermore, in some embodiments, the road surface feature may include at least one of a road edge or a lane marking.

Moreover, as discussed below with respect to "crowdsourcing," the road surface feature may be identified through image analysis of a plurality of images acquired as one or more vehicles traverse the road segment.

FIG. 9A shows polynomial representations of trajectories captured during a process of building or maintaining a sparse map. A polynomial representation of a target trajectory included in a sparse map may be determined based on two or more reconstructed trajectories of prior traversals of vehicles along the same road segment. In some embodiments, the polynomial representation of the target trajectory included in a sparse map may be an aggregation of two or more reconstructed trajectories of prior traversals of vehicles along the same road segment. In some embodiments, the polynomial representation of the target trajectory included in a sparse map may be an average of the two or more reconstructed trajectories of prior traversals of vehicles along the same road segment. Other mathematical operations may also be used to construct a target trajectory along a road path based on reconstructed trajectories collected from vehicles traversing along a road segment.

As shown in FIG. 9A, a road segment 900 may be travelled by a number of vehicles 200 at different times. Each vehicle 200 may collect data relating to a path that the vehicle took along the road segment. The path traveled by a particular vehicle may be determined based on camera data, accelerometer information, speed sensor information, and/or GPS information, among other potential sources. Such data may be used to reconstruct trajectories of vehicles traveling along the road segment, and based on these reconstructed trajectories, a target trajectory (or multiple target trajectories) may be determined for the particular road segment. Such target trajectories may represent a preferred path of a host vehicle (e.g., guided by an autonomous navigation system) as the vehicle travels along the road segment.

In the example shown in FIG. 9A, a first reconstructed trajectory 901 may be determined based on data received from a first vehicle traversing road segment 900 at a first time period (e.g., day 1), a second reconstructed trajectory 902 may be obtained from a second vehicle traversing road segment 900 at a second time period (e.g., day 2), and a third reconstructed trajectory 903 may be obtained from a third vehicle traversing road segment 900 at a third time period (e.g., day 3). Each trajectory 901, 902, and 903 may be represented by a polynomial, such as a three-dimensional polynomial. It should be noted that in some embodiments, any of the reconstructed trajectories may be assembled onboard the vehicles traversing road segment 900.

Additionally, or alternatively, such reconstructed trajectories may be determined on a server side based on information received from vehicles traversing road segment 900. For example, in some embodiments, vehicles 200 may transmit data to one or more servers relating to their motion along road segment 900 (e.g., steering angle, heading, time, position, speed, sensed road geometry, and/or sensed landmarks, among things). The server may reconstruct trajectories for vehicles 200 based on the received data. The server may also generate a target trajectory for guiding navigation of autonomous vehicle that will travel along the same road segment 900 at a later time based on the first, second, and third trajectories 901, 902, and 903. While a target trajectory may be associated with a single prior traversal of a road segment, in some embodiments, each target trajectory included in a sparse map may be determined based on two or more reconstructed trajectories of vehicles traversing the same road segment. In FIG. 9A, the target trajectory is represented by 910. In some embodiments, the target trajectory 910 may be generated based on an average of the first, second, and third trajectories 901, 902, and 903. In some embodiments, the target trajectory 910 included in a sparse map may be an aggregation (e.g., a weighted combination) of two or more reconstructed trajectories. Aligning drive data to construct trajectories is further discussed below with respect to FIG. 29.

Figure 9B:
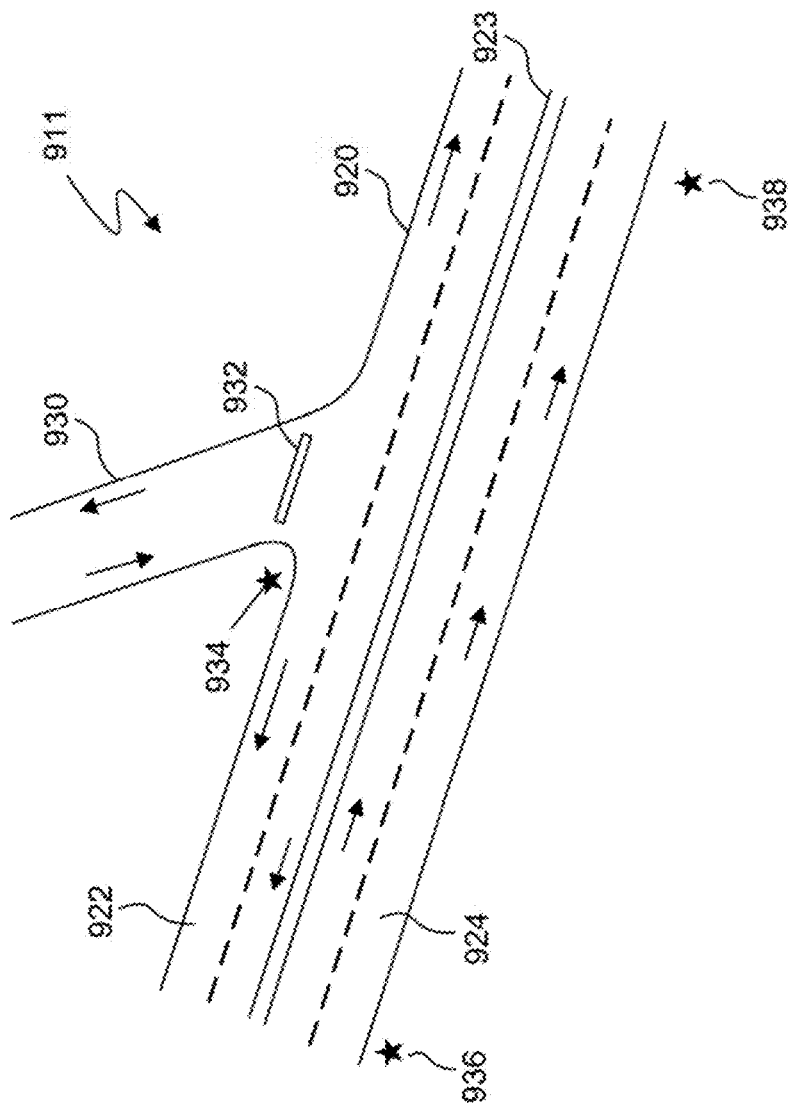
FIGS. 9B and 9C show target trajectories along a multi-lane road consistent with disclosed embodiments.
Figure 9C:
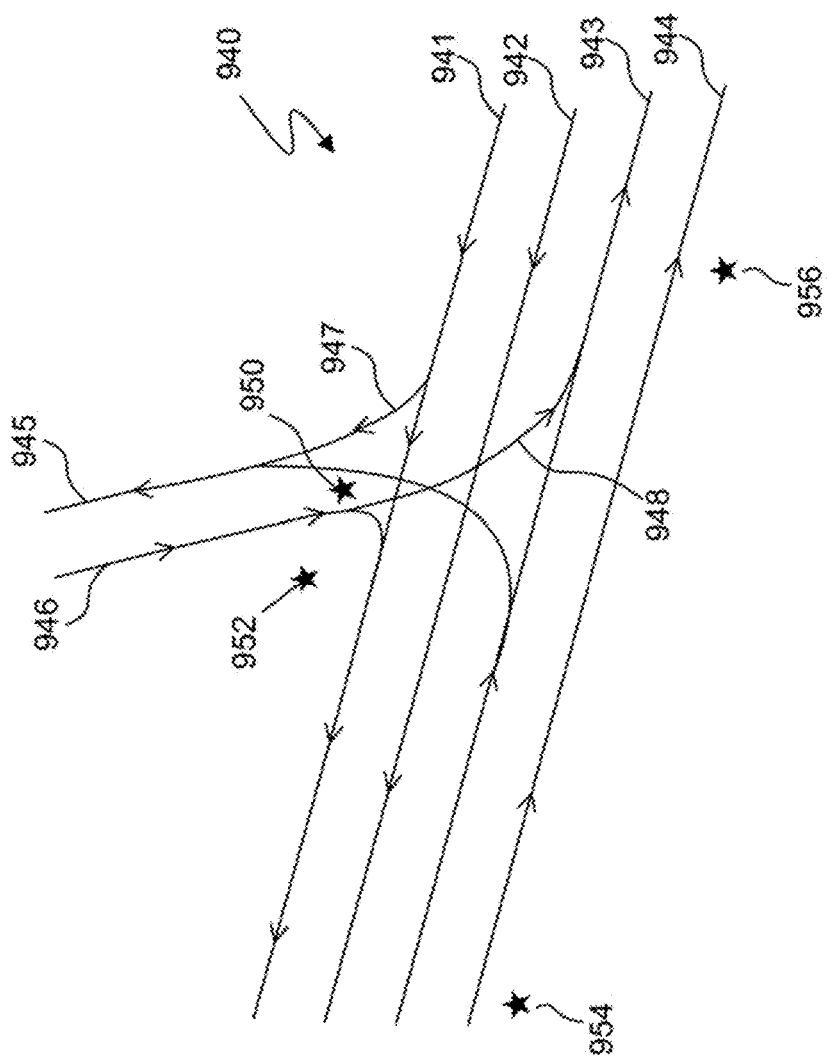

FIGS. 9B and 9C further illustrate the concept of target trajectories associated with road segments present within a geographic region 911. As shown in FIG. 9B, a first road segment 920 within geographic region 911 may include a multilane road, which includes two lanes 922 designated for vehicle travel in a first direction and two additional lanes 924 designated for vehicle travel in a second direction opposite to the first direction. Lanes 922 and lanes 924 may be separated by a double yellow line 923. Geographic region 911 may also include a branching road segment 930 that intersects with road segment 920. Road segment 930 may include a two-lane road, each lane being designated for a different direction of travel. Geographic region 911 may also include other road features, such as a stop line 932, a stop sign 934, a speed limit sign 936, and a hazard sign 938.

As shown in FIG. 9C, a sparse map may include a local map 940 including a road model for assisting with autonomous navigation of vehicles within geographic region 911. For example, local map 940 may include target trajectories for one or more lanes associated with road segments 920 and/or 930 within geographic region 911. For example, local map 940 may include target trajectories 941 and/or 942 that an autonomous vehicle may access or rely upon when traversing lanes 922. Similarly, local map 940 may include target trajectories 943 and/or 944 that an autonomous vehicle may access or rely upon when traversing lanes 924. Further, local map 940 may include target trajectories 945 and/or 946 that an autonomous vehicle may access or rely upon when traversing road segment 930. Target trajectory 947 represents a preferred path an autonomous vehicle should follow when transitioning from lanes 920 (and specifically, relative to target trajectory 941 associated with a right-most lane of lanes 920) to road segment 930 (and specifically, relative to a target trajectory 945 associated with a first side of road segment 930. Similarly, target trajectory 948 represents a preferred path an autonomous vehicle should follow when transitioning from road segment 930 (and specifically, relative to target trajectory 946) to a portion of road segment 924 (and specifically, as shown, relative to a target trajectory 943 associated with a left lane of lanes 924.

A sparse map may also include representations of other road-related features associated with geographic region 911. For example, a sparse map may also include representations of one or more landmarks identified in geographic region 911. Such landmarks may include a first landmark 950 associated with stop line 932, a second landmark 952 associated with stop sign 934, a third landmark associated with speed limit sign 954, and a fourth landmark 956 associated with hazard sign 938. Such landmarks may be used, for example, to assist an autonomous vehicle in determining its current location relative to any of the shown target trajectories, such that the vehicle may adjust its heading to match a direction of the target trajectory at the determined location.

Figure 9D:
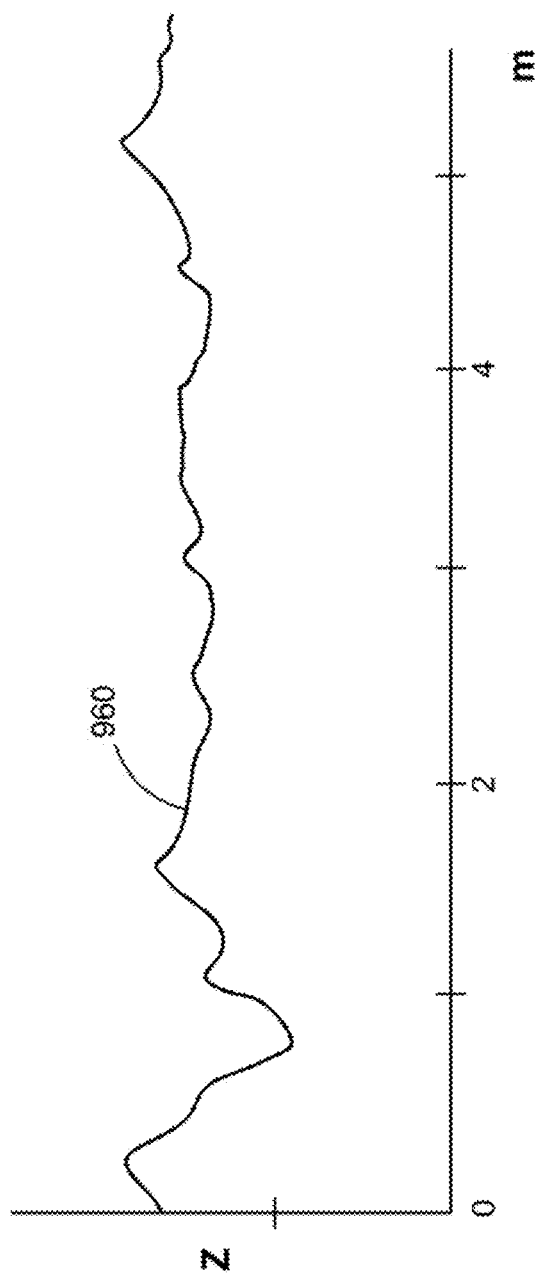
FIG. 9D shows an example road signature profile consistent with disclosed embodiments.

In some embodiments, a sparse map may also include road signature profiles. Such road signature profiles may be associated with any discernible/measurable variation in at least one parameter associated with a road. For example, in some cases, such profiles may be associated with variations in road surface information such as variations in surface roughness of a particular road segment, variations in road width over a particular road segment, variations in distances between dashed lines painted along a particular road segment, variations in road curvature along a particular road segment, etc. FIG. 9D shows an example of a road signature profile 960. While profile 960 may represent any of the parameters mentioned above, or others, in one example, profile 960 may represent a measure of road surface roughness, as obtained, for example, by monitoring one or more sensors providing outputs indicative of an amount of suspension displacement as a vehicle travels a particular road segment.

Alternatively or concurrently, profile 960 may represent variation in road width, as determined based on image data obtained via a camera onboard a vehicle traveling a particular road segment. Such profiles may be useful, for example, in determining a particular location of an autonomous vehicle relative to a particular target trajectory. That is, as it traverses a road segment, an autonomous vehicle may measure a profile associated with one or more parameters associated with the road segment. If the measured profile can be correlated/matched with a predetermined profile that plots the parameter variation with respect to position along the road segment, then the measured and predetermined profiles may be used (e.g., by overlaying corresponding sections of the measured and predetermined profiles) in order to determine a current position along the road segment and, therefore, a current position relative to a target trajectory for the road segment.

In some embodiments, a sparse map may include different trajectories based on different characteristics associated with a user of autonomous vehicles, environmental conditions, and/or other parameters relating to driving. For example, in some embodiments, different trajectories may be generated based on different user preferences and/or profiles. A sparse map including such different trajectories may be provided to different autonomous vehicles of different users. For example, some users may prefer to avoid toll roads, while others may prefer to take the shortest or fastest routes, regardless of whether there is a toll road on the route. The disclosed systems may generate different sparse maps with different trajectories based on such different user preferences or profiles. As another example, some users may prefer to travel in a fast moving lane, while others may prefer to maintain a position in the central lane at all times.

Different trajectories may be generated and included in a sparse map based on different environmental conditions, such as day and night, snow, rain, fog, etc. Autonomous vehicles driving under different environmental conditions may be provided with a sparse map generated based on such different environmental conditions. In some embodiments, cameras provided on autonomous vehicles may detect the environmental conditions, and may provide such information back to a server that generates and provides sparse maps. For example, the server may generate or update an already generated a sparse map to include trajectories that may be more suitable or safer for autonomous driving under the detected environmental conditions. The update of a sparse map based on environmental conditions may be performed dynamically as the autonomous vehicles are traveling along roads.

Other different parameters relating to driving may also be used as a basis for generating and providing different sparse maps to different autonomous vehicles. For example, when an autonomous vehicle is traveling at a high speed, turns may be tighter. Trajectories associated with specific lanes, rather than roads, may be included in a sparse map such that the autonomous vehicle may maintain within a specific lane as the vehicle follows a specific trajectory. When an image captured by a camera onboard the autonomous vehicle indicates that the vehicle has drifted outside of the lane (e.g., crossed the lane mark), an action may be triggered within the vehicle to bring the vehicle back to the designated lane according to the specific trajectory.

Figure 10:
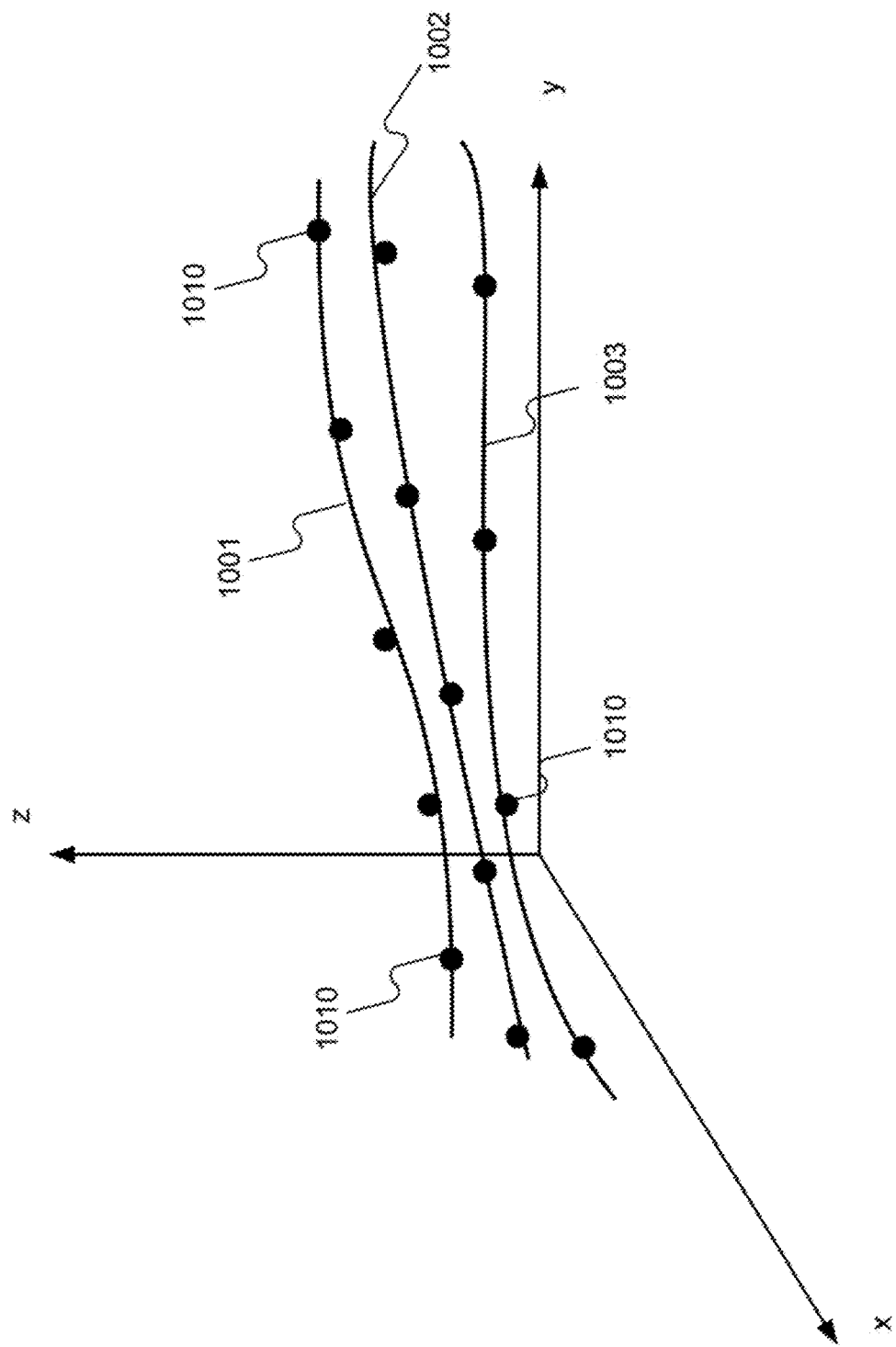
FIG. 10 illustrates an example autonomous vehicle road navigation model represented by a plurality of three dimensional splines, consistent with the disclosed embodiments.

FIG. 10 illustrates an example autonomous vehicle road navigation model represented by a plurality of three dimensional splines 1001, 1002, and 1003. The curves 1001, 1002, and 1003 shown in FIG. 10 are for illustration purpose only. Each spline may include one or more three dimensional polynomials connecting a plurality of data points 1010. Each polynomial may be a first order polynomial, a second order polynomial, a third order polynomial, or a combination of any suitable polynomials having different orders. Each data point 1010 may be associated with the navigation information received from a plurality of vehicles. In some embodiments, each data point 1010 may be associated with data related to landmarks (e.g., size, location, and identification information of landmarks) and/or road signature profiles (e.g., road geometry, road roughness profile, road curvature profile, road width profile). In some embodiments, some data points 1010 may be associated with data related to landmarks, and others may be associated with data related to road signature profiles.

Figure 11:
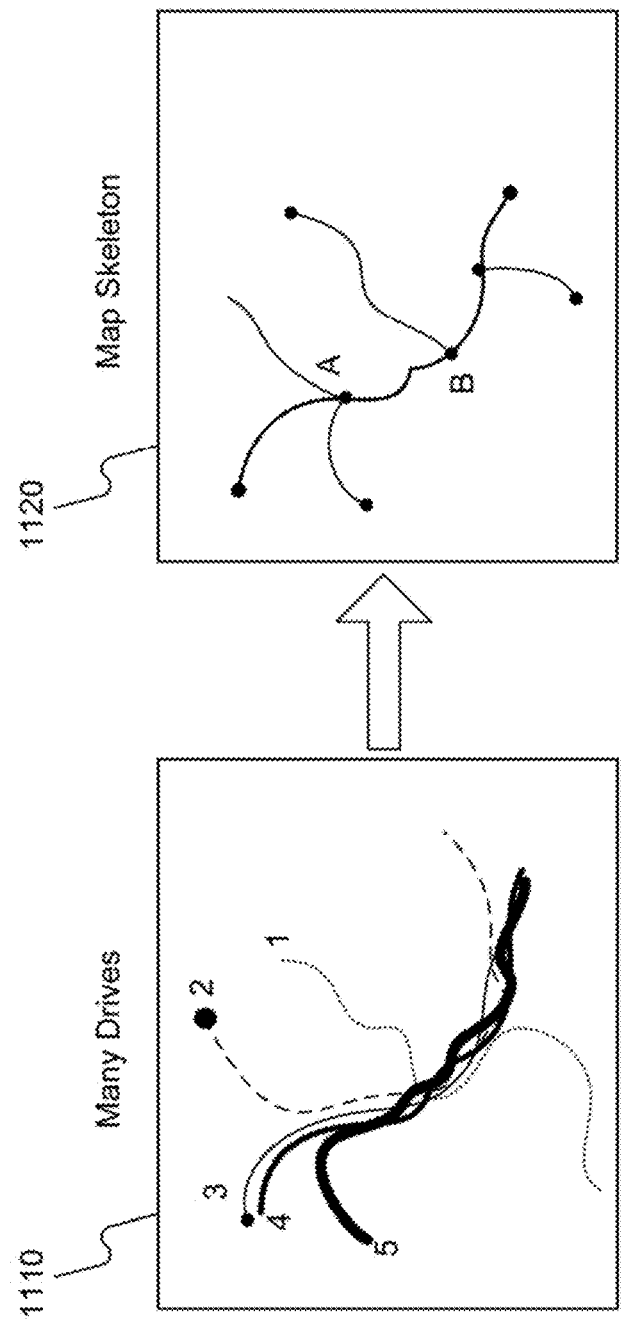
FIG. 11 shows a map skeleton generated from combining location information from many drives, consistent with the disclosed embodiments.

FIG. 11 illustrates raw location data 1110 (e.g., GPS data) received from five separate drives. One drive may be separate from another drive if it was traversed by separate vehicles at the same time, by the same vehicle at separate times, or by separate vehicles at separate times. To account for errors in the location data 1110 and for differing locations of vehicles within the same lane (e.g., one vehicle may drive closer to the left of a lane than another), a remote server may generate a map skeleton 1120 using one or more statistical techniques to determine whether variations in the raw location data 1110 represent actual divergences or statistical errors. Each path within skeleton 1120 may be linked back to the raw data 1110 that formed the path. For example, the path between A and B within skeleton 1120 is linked to raw data 1110 from drives 2, 3, 4, and 5 but not from drive 1. Skeleton 1120 may not be detailed enough to be used to navigate a vehicle (e.g., because it combines drives from multiple lanes on the same road unlike the splines described above) but may provide useful topological information and may be used to define intersections.

Clustering Event Information for Vehicle Navigation

As described above, the disclosed systems and methods may include collecting information from multiple vehicles or other sources and generating a sparse map for autonomous vehicle navigation based on the collected information. Such information used to generate sparse maps may include relatively permanently located road features, such as potential landmarks and associated locations (e.g., identified road signs, road markings, particular buildings, etc. along with their associated locations). The information may also relate to more transient road features. For example, the information collected from vehicles traversing a roadway may include transient road features such as construction zones, potholes, road barriers, etc. along with associated location information. In some cases, this information may be used in developing sparse maps useful in navigation. In other cases, the information relating to semi-permanent or transient roadway conditions or features may be used to generate reports to one or more vehicles that may be used for navigation. These reports may be included with or may be provided separate from sparse maps delivered to one or more vehicles for navigation. In other embodiments, instead of being separate, the reports maybe in the form of a tag, a flag, or other information within the sparse maps indicating the semi-permanent or transient roadway condition. In some cases, the reports provided to vehicles for navigation may relate to highly transient road conditions, such as identified traffic slowdowns, encountered pedestrians in a roadway, etc.

In the disclosed systems and methods, therefore, many reports of roadway conditions may be generated and may be received by a centralized system from multiple vehicles navigating on roadways. Roadway conditions may refer to any object or group of objects which a system or device (e.g., a road condition reporting module) on board a vehicle is capable of detecting and is configured to report back to a remote computer, or directly report to other vehicles or smart road infrastructure systems. In some embodiments, the other vehicles may be vehicles in a vicinity of the reporting vehicle. The roadway conditions may include a plurality of predefined objects or conditions, such as potential landmarks, road features, construction zones, potholes, pedestrians, traffic slowdowns, a car located at the start of a traffic slowdown or marking a start of a traffic slowdown, or any other roadway-related conditions. The roadway conditions may also include general objects, such as a box or other object of no specific type, having at least a certain height, that is located on the road. Whether the object is considered a roadway condition may further depend on whether or not the object is in motion.

In some embodiments, to generate such vehicle reports, multiple informational reports may be collected from a plurality of vehicles to improve reliability. For example, by receiving multiple reports of the same roadway condition, it may be possible to more correctly identify a location of the roadway condition in one or more of the reports. One challenge in such a system is aggregating the received reports into information that is usable by a vehicle navigating a roadway. For example, in some cases, all of the received reports may be passed along to one or more vehicles. In such cases, while the receiving vehicle may be able to assess the received information and account for the received information to determine an appropriate or target navigational action for the vehicle, such an approach may require significant processing capabilities onboard each receiving vehicle. Additionally, such a system may require wireless communication pathways between vehicles and a server that have sufficient bandwidth to transmit hundreds, thousands, or millions of reports gathered (e.g., crowd sourced) from multiple vehicles about certain roadways.

In other cases, the information acquired from vehicles traversing roadways may be aggregated by a central server-based system, such that the reports provided to vehicles for navigation may be more concise. For example, in some situations, information received from vehicles traversing a roadway may be analyzed to determine whether the received information relates to common conditions or road features. In such cases, the received information relating to common conditions or road features may be aggregated into one or more reports to be provided to vehicles for navigation. Each navigational report provided to vehicles for navigation may constitute an aggregation of two or more informational reports received by the central server-based system from vehicles traversing a roadway. The use of such aggregated navigational reports may reduce the level of processing and analysis that must occur at a particular vehicle (e.g., by a navigational controller in a particular vehicle) in order to determine navigational actions for the vehicle and may also reduce the bandwidth requirements for communications between the central server-based system(s) and the receiving vehicles.

Systems and methods are disclosed for clustering information received from a fleet of vehicles, such as autonomous vehicles, and providing reports to the fleet of vehicles based on the clustered information. An autonomous vehicle may refer to any vehicle with sensing and/or processing systems, including ADAS equipped vehicles. An autonomous vehicle may typically include an onboard camera and other devices for detecting and processing visual data. The clustering of information may refer to the aggregation of information received as part of an information stream from one or more vehicles. Additionally, the navigational reports generated based on the clustered information may be delivered to one or more vehicles that are part of the same group or a different group relative to the vehicles that sent the information upon which the navigational reports were generated. In some cases, a fleet of vehicles may refer to a group of vehicles under common control (e.g., a fleet of rental cars, ride-sharing cars, cars for hire, etc.). In other cases, a fleet of vehicles may refer to a group of vehicles operating according to at least one common protocol (e.g., a navigational controller equipped to navigate based on a delivered sparse map). In some embodiments, the group of vehicles may be configured to provide reports (e.g., informational vehicle reports) according to a predefined protocol. In still other cases, a fleet of vehicles may refer to two or more vehicles operating independently.

Each vehicle in the fleet may include at least one processor configured to execute software instructions residing on the vehicle in order to provide information to a remote server for analysis and report creation. For example, a sensing system and/or a navigation system included in a particular vehicle may collect information during navigation and transmit reports to the remote server regarding conditions or features of a roadway experienced or observed by the vehicle/navigation system. The vehicle may transmit such reports on a regular basis (e.g., at each event occurrence, at periodic time intervals, etc.). The reports may include images captured from one or more cameras, information derived from one or more captured images (e.g., based on processor-based image analysis of captured images), location information (e.g., GPS information), LIDAR point clouds from one or more LIDAR devices, RADAR outputs, identified road features (e.g., identified road markings and corresponding locations, potholes and corresponding locations, stopped cars and corresponding locations, pedestrians and corresponding locations), etc. The remote server may analyze the received information in order to generate a navigational report related to an event at a particular location, such as traffic congestion, a pothole, a broken-down vehicle blocking a travel lane, etc., and then distribute the report to the vehicles in the fleet. In some cases, each navigational report may be generated through aggregation or clustering of information received from vehicles navigating along a roadway. In some cases, only one such clustered, navigational report may be sent per detected event. In other cases, more than one such clustered, navigational report may be sent per detected event.

As used herein, "an event" may relate to any observable condition or occurrence in an environment of a vehicle. For example, an event may refer to any of the roadway conditions or features described above. Some events may be of a transient nature. For example, a pedestrian stepping onto road is typically a transient condition. As such, the disclosed systems and methods may receive information from a vehicle related to a transient condition and then issue a report to a fleet of vehicles concerning such an event quickly as the event may only last for a brief duration (e.g., the pedestrian is likely to move along). As used herein, semi-permanent or transient events may refer to events (including roadway features or conditions) that are or are, by nature, capable of self-motion or which are typically moved, shifted or otherwise relocated. In this regard, it would be appreciated that an object or feature may be determined to be semi-permanent or transient when the object (either an object of a specific type or a general detected object) is detected near or on the road and it is in motion. Such objects may include a vehicle that is located at or marks the starting point of a traffic jam, or a non-descript box on the road that is moving, for example, due to strong winds. Motion may be inferred from images (using various image processing and motion detection techniques), from range measurements of a LIDAR or RADAR system onboard the vehicle, or any other means for detecting motion. In other instances, the object may be stationary, but may be identified as an object that is capable of motion. For example, a baby cart (e.g., a stroller) may be detected and classified as a baby cart, and the system may recognize that one of its characteristics is that it can be in motion. In another example, the sensing system onboard the vehicle may identify a temporary or moving road sign, such as signs that may be used to warn drivers of a slow-moving road cleaning vehicle, a construction vehicle, other infrastructure maintenance vehicles, or other vehicles. In some embodiments, a temporary or moving road sign may be identified by its appearance (for example, using an object detection algorithm). In instances where the sign is moving, a detected motion of the sign may also be an indication of its semi-permanent or transient nature or characteristics. In some embodiments, features that have a time-to-live (TTL) associated with them in the crowd sources map, such as events with an associated expiration period as described in further detail below, may be considered transient or semi-permanent.

On the other hand, other events may be more likely to persist for a longer time period, such as traffic jams, potholes, parked vehicles, etc. As reporting such events to the fleet is typically less time critical, the disclosed systems and methods may report persistent events on a regular basis so long as the event exists. For example, a traffic jam may be reported to a fleet of vehicles (e.g., a group of vehicles in a particular region) at predetermined time intervals (e.g., every minute, every five minutes, etc.) for the duration of the event.

As each vehicle in a fleet may encounter reportable conditions on a continuous basis, the sheer volume of information being collected and transmitted from the vehicles to the remote server presents a unique challenge. As multiple vehicles may report the same event, it may be both impractical and inefficient to broadcast to the fleet repetitive reports related to the same event. For example, although many vehicles may encounter a traffic jam and many traffic jams may exist in different locations at any given time, it may be desirable to provide only one report to the fleet for each traffic jam instead of repetitive and redundant reports for the same traffic jam. Accordingly, the disclosed systems and methods may determine whether information received from one vehicle (or a group of vehicles) relates to information received from another vehicle (or another group of vehicles). In other words, the disclosed systems and methods may determine whether multiple vehicles in a fleet are reporting the same event and issue one report (or at least an aggregated/clustered navigational report) for that event.

The disclosed systems and methods also address a challenge that is presented when an autonomous vehicle encounters a stopped vehicle, which may be a difficult situation for an autonomous vehicle to accurately interpret. For example, in some cases, a detected, stopped car in a lane of travel may be associated with a traffic jam. In other situations, a detected, stopped vehicle in a lane of travel may be broken down or simply double parking, and may not be associated with other stopped vehicles. While these situations may appear similar to the sensing systems of an autonomous vehicle, such as when the stopped vehicle substantially blocks field of view of the sensors aboard the host vehicle, each may be associated with a different preferred navigational response. For example, if the stopped vehicle is part of a traffic jam, then the autonomous vehicle should not pass and should simply wait for the traffic ahead of it to move. On the other hand, if the stopped vehicle is simply a lone vehicle blocking a travel lane (e.g., a vehicle that has broken down, a parked delivery truck, etc.), the autonomous vehicle may pass. In many cases, a lone vehicle may determine that the information it has collected is insufficient for deciding which of these possibilities is present. By analyzing information received from multiple vantage points (e.g., from vehicles traveling in different travel lanes, vehicles traveling on opposite sides of a road, vehicles that have passed the stopped vehicle, vehicles included in the event (e.g., stopped in the traffic jam), etc.), the disclosed systems and methods may determine not only whether information received from two or more vehicle relates to the same event, but may also determine with more specificity the full nature of the event (e.g., whether the event is merely a lone parked vehicle or the last vehicle in a line of stopped vehicles in a traffic jam). As a result, aggregated navigational reports may enable more robust, informed decision making by navigational systems of an autonomous vehicles.

As mentioned, the disclosed systems and methods may process a large volume of information and thus may need to determine whether information is related. That is, if multiple received informational reports relate to a common event, it may be necessary and/or desirable to generate only one navigational report relative to that event. Clustering or cluster analysis enables the aggregation of such informational reports into related groupings. However, conventional algorithms for clustering are not suitable for analyzing information that is received continuously from multiple sources in real-time, such as information received from a fleet of vehicles. For example, conventional algorithms typically operate under the assumption that all information is ready for clustering when the clustering process begins. In situations in which vehicles are continually transmitting new information, this is typically not the case. Additionally, conventional clustering algorithms typically require knowledge up front (i.e., when initiating a clustering process) of the number of clusters (i.e., how many groups to organize the data into) to expect, or the number of reports to expect for each cluster. However, when information is crowdsourced from vehicles, the number of clusters may change and indeed evolve over time (especially where the types of events or conditions experienced and reported by vehicles do not fall within a predetermined set of events or conditions, but may be unique to a particular scenario). Additionally, in some cases, as more information is received from a fleet of vehicles, it may be possible to determine that information previously understood to relate to separate events in fact relates to the same event (e.g., that two vehicles are reporting the same traffic jam and not two separate traffic jams). In the disclosed systems and methods, a cluster used to aggregate information about an encountered event or condition may be determined dynamically and based on the type of information reported by vehicles traveling on a roadway.

To address the drawbacks of conventional clustering techniques, the disclosed systems and methods may determine whether to cluster previously received reports when a new report is received from vehicles in a fleet. For example, after receiving a new informational report, a server-based system may determine whether the report relates to any previous event. If so, it may be clustered with the prior event. If not, a new cluster may be generated. Clustering may occur when new informational reports arrive at the server, and clustering may occur on an ongoing basis in order to take into account additional information and any changed circumstances.

Clustering may be based on event type. That is, events relating to a common event, such as a detected pothole, detected pedestrian, etc. may be grouped together into a single cluster (e.g., stored together or referenced as related in a cluster database). Clustering may also be based on spatial relationships. For example, informational reports about a detected pothole in one location or region may be grouped together in a first cluster, while informational reports about a detected pothole in a different location or region may be grouped together in a second cluster different from the first cluster. A cluster may be defined based on one or both of a temporal and spatial relationship. The spatial relationship may depend on the relative location of the events (e.g., a distance between the events, etc.). The temporal relationship may be defined by a time-related parameter in the map/cluster generation process. For example, the temporal relationship may be based on the expiration period of an event or informational report, as described below. In accordance with the disclosed embodiments, and to aid in this spatial organization of events, a particular region in the real world may be subdivided into sub-regions referred to as cells. The cells may be stored as part of a database accessible to or included in a server. The disclosed systems and methods may establish a cell size for each cell. In some embodiments, a cell may have a size in meters (e.g., two square meters, five square meters, ten square meters, fifty square meters, one hundred square meters, etc.) that corresponds to a real-world location having the specified size. Cell size may be based on location accuracy of systems such as GPS. For example, as location accuracy increases, cell size may be decreased (e.g., to less than a meter square, 0.5 meter square, etc.). In some embodiments, the size of the cells may depend upon data density considerations. For example, a rural region may have larger cell sizes as opposed to an urban region. As another example, portions of roadways that are associated with higher traffic congestion may have smaller cell sizes as opposed to less busy portions. The size of the cell may also be determined based on the type of event, a density of the reports, local regulations, user preference, the state and/or the capabilities of the systems onboard the vehicle or of vehicles and other road users surrounding the host vehicle (e.g., whether it is in fully AV mode or only in a more limited driver assist mode etc.).

Figure 12:
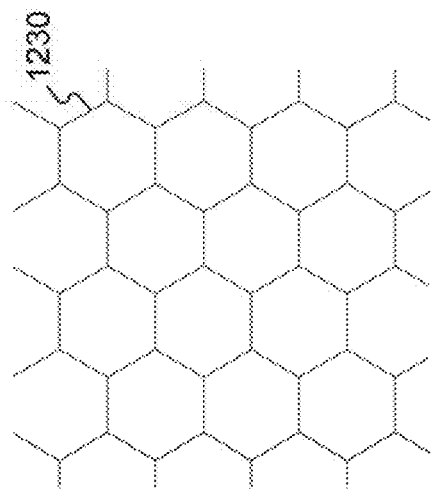
FIG. 12 illustrates example cell configurations consistent with the disclosed embodiments.
Figure 12:
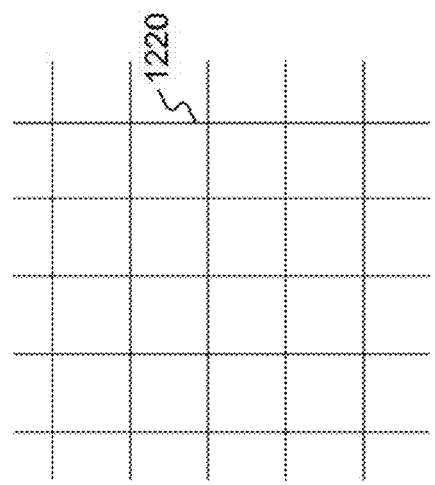
Figure 12:
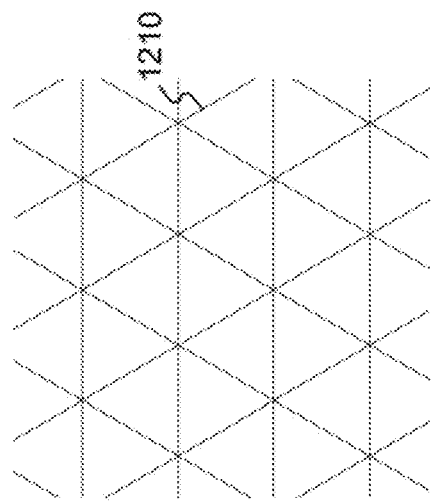

Moreover, cells may have any appropriate shape. For example, a region (e.g., a city, town, state, country, jurisdiction, etc.) may be divided into cells that are square, rectangular, triangular, hexagonal, etc. FIG. 12 illustrates example cell configurations consistent with the disclosed embodiments. In some embodiments, the cells may have a shape capable of forming a regular tessellation, such as triangular cell pattern 1210, square cell pattern 1220, or hexagonal cell pattern 1230. In some embodiments, similar to cell size, cell shape may vary depending on data density or other considerations. For example, an urban region associated with higher traffic congestion may have square cells while a rural region may have larger rectangular cells.

In some embodiments, a cell may include an identifier (e.g., a unique alphanumeric identifier), a location, and a timestamp. Additionally, in some embodiments, a cell may include an identifier of a cluster to which the cell belongs. In some embodiments, cells may also have an associated expiration period. The expiration period may represent a period of time for which an event reported at a location within the cell is considered valid. For example, an expiration period may begin when an informational report identifying an event at a location within the cell is received. After the cell has expired (when the expiration period has passed), it may be assumed that a condition associated with the event is no longer present. Accordingly, the cell may be removed from a cluster until the event is verified or confirmed for that cell, which may be defined as a new event.

The duration of an expiration period for a cell may depend on various factors. In some embodiments, the duration may depend on the type of event reported in the location. The type of event may be based on a specific object type. By identifying the type of an object, its temporal or dynamic characteristics may be implicitly inferred. For example, an event associated with a pedestrian in the road may be considered more transient than an event associated with a detected pothole. Accordingly, the expiration period for the cell associated with the reported pedestrian may be relatively shorter. In other embodiments, the temporal or dynamic characteristics may be inferred from direct measurements, such as the speed of the object's motion as measured by one or more reporting entities. In some embodiments, the expiration period may depend at least partially on a location of the cell. For example, cells in areas with high pedestrian traffic but relatively low vehicle traffic may generally have longer expiration periods. Further, in some embodiments, the expiration period for a given cell may depend on historical data. For example, a cell located along a road with high traffic congestion may frequently be associated with longer reported events. Accordingly, the cell may develop a longer default expiration period that approximates the expected duration of events previously reported within the cell. In some embodiments, the duration of the expiration period may depend on a time of the reported event, such as a time of day, a day of the week, a time of the year, or any other relevant time information. For example, events that occur during rush hour on a weekday may have different expiration periods than events that occur on a weekend or holiday. Other factors that may influence expiration period duration may include the current weather, a type of vehicle reporting the event, a type of vehicle involved in the event, the number of vehicles reporting the event, the direction the reporting vehicle is traveling relative to the event, or any other factors that may be relevant. In some embodiments, the expiration period may be dynamic. For example, as additional reports for the same event are received, the expiration period for cells associated with the event may be reset and/or adjusted.

In one embodiment, a server may receive a report from a host vehicle and assign the data associated with the report to a particular cell that includes a location specified in the report. For example, if the received informational report relates to a detected pothole at particular GPS coordinates, the server may determine which cell includes the location specified by the GPS coordinates. The detected pothole may be associated with the determined cell. The server may then query surrounding cells to determine whether the new report relates to an event that was previously reported by one or more other vehicles in the fleet. For example, for cells of a rectangular or square shape in a regular matrix of squares or rectangles, the disclosed systems and methods may query the eight surrounding cells that are contiguous with the cell. If the server determines that a surrounding cell is associated with a report or cluster related to the same event (e.g., because the events are close in location or have at least one reported characteristic in common), the disclosed systems and methods may combine the incoming report with the preexisting report/cluster to create an aggregated cluster (e.g., a group). The cluster may include, for example, identifiers of the cell(s) to which the cluster belongs. If, on the other hand, the surrounding cells do not store a report related to the same event, the disclosed systems and methods may create a new cluster for the cell.

Clustering event reports may enable increased accuracy for event position determinations. For example, as more event reports are received and are determined to be related to the same event, the associated positions detected and reported for those events may be aggregated to provide a refined position for the event. In some cases, for example, after receiving reports from multiple vehicles related to the same event (i.e., part of the same cluster), the disclosed systems and methods may average the reported locations for the detected event in the cluster in order to increase location accuracy. A cluster, therefore, may store location information for an event that represents an average of the location information from two or more informational reports. In some embodiments, each row in a cluster database may provide one informational report (e.g., a cluster may be represented by a cluster identifier, such as C1, and provide an average X location, an average Y location, and a count representing a number of cells associated with the cluster).

In some embodiments, the disclosed systems and methods may merge clusters. For example, when the disclosed systems and methods determine that two previously established clusters do not represent two different events, but rather refer to one event, the clusters may be merged. The data for those clusters may be merged as well, and location information may be averaged for the merged clusters. Such merging may be based on receipt of at least one informational report suggesting a link between detected events.

For example, in some embodiments, the disclosed systems and methods may determine a commonality between events for two more clusters, conclude that the events refer to one event, and merge the clusters. Merging the clusters may include updating a database (e.g., a database related to clusters) such that database entries for a particular cluster are consolidated. For example, consider two clusters, having cluster identifiers of C1 and C2, with each cluster having a database entry. Each database entry for C1 and C2 may include an average X location value, an average Y location value, and a count (e.g., a number of events related to the cluster). After the system determines that C1 and C2 should be merged into a consolidated cluster, the system may replace C1 and C2 with a revised version of C1 (e.g., C1 and C2 are collapsed into a revised C1 in the database). The revised C1 may store a weighted average of the location information depending upon the number of events (e.g., based on the "count" information for each cluster, C1 and C2, prior to the merge). The system may thus store the weighted average location information (e.g., a new average X location value and a new average Y location value) based on this calculation in revised C1 along with a revised count value (e.g., a sum of the counts of C1 and C2). In other embodiments, the database may contain entries for each cell, each reported event, or other suitable configurations. One of ordinary skill will recognize that a similar procedure may be used to merge information for any two or more clusters into a revised cluster representing the merged cluster.

In some embodiments, the disclosed systems and methods may make use of a cell database, which may store information indicating which clusters belong to which cells. For example, a cluster may represent an event such as a traffic jam. Traffic jams may grow over time, causing a back-up that might span a significant distance (e.g., several miles or kilometers). As discussed, the cell database may indicate the cells associated with a cluster. For example, for a cluster having a cluster identifier of C1, the cell database may indicate that C1 includes cell 1, cell 2, and cell 3, which may be contiguous cells. Further, C1 may represent a traffic jam. Thus, the traffic jam may begin at a location in cell 1, continue through cell 2, and end at a location in cell 3. This distance could be, for example, several miles. Accordingly, when providing a navigational report for the traffic jam for the cluster (e.g., for C1), by inspecting the cell database, the system may determine a starting point and/or ending point of the event (e.g., the traffic jam). In some embodiments, the starting point and/or ending point of an event may be determined relative to a particular location or vehicle in the fleet (e.g., the traffic jam begins in 5 miles from a particular location or is 5 miles away from a current location of a particular vehicle in the fleet) and that the ending point of the traffic jam is three miles from the starting point (e.g., the traffic jam's ending point is 8 miles away from a particular location or is 8 miles away from a current location of a particular vehicle in the fleet).

Figure 13A:
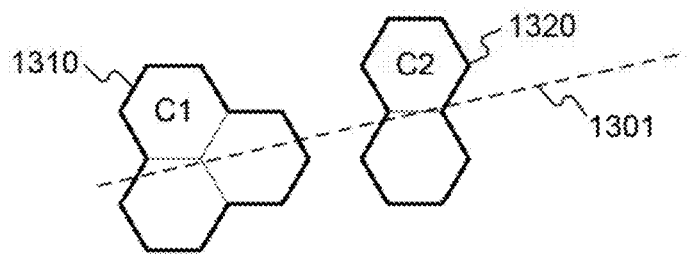
FIGS. 13A-13G illustrate example clustering operations that may be performed consistent with the disclosed embodiments.
Figure 13B:
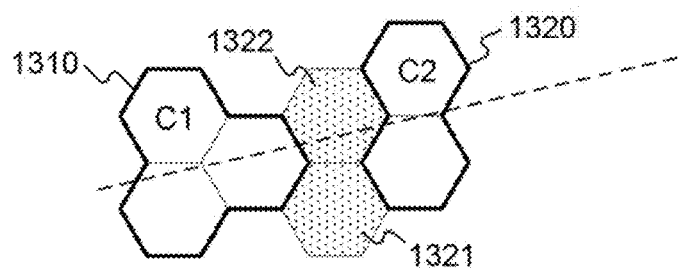
Figure 13C:
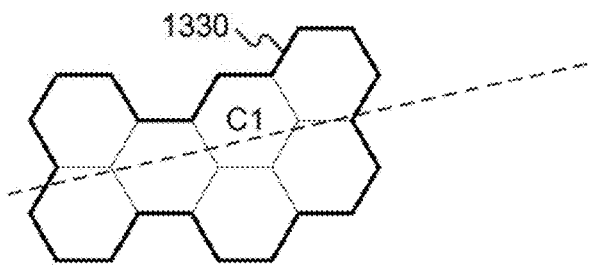

FIGS. 13A-13G illustrate example clustering operations that may be performed consistent with the disclosed embodiments. For example, the clustering shown in FIGS. 13A-13G may represent a traffic jam or other event detected along a roadway. As shown in FIG. 13A, a database may include clusters 1310 and 1320, which may have associated cluster IDs C1 and C2, respectively. Clusters 1310 and 1320 may be located along a roadway, as represented by path 1301. Path 1301 may represent a target trajectory in a sparse map, as described above. As shown, cluster 1310 may include three cells associated with reported events and cluster 1320 may include two cells associated with reported events. As additional informational reports are received, clusters 1310 and 1320 may be updated. For example, as shown in FIG. 13B, additional event reports may be received for locations within cells 1321 and 1322 (as indicated by the light shading in those cells). Additional cells 1321 and 1322 may indicate a link between the events associated with cluster 1310 and the events associated with cluster 1320. Accordingly, as shown in FIG. 13C, clusters 1310 and 1320 may be merged to form cluster 1330. As discussed above, a common cluster ID may be assigned to the merged cluster. For example, merged cluster 1330 may be assigned a cluster ID of C1, as shown in FIG. 13C. Accordingly, database entries associated with cells of former cluster 1320 may be updated to reflect the merged cluster ID.

Figure 13D:
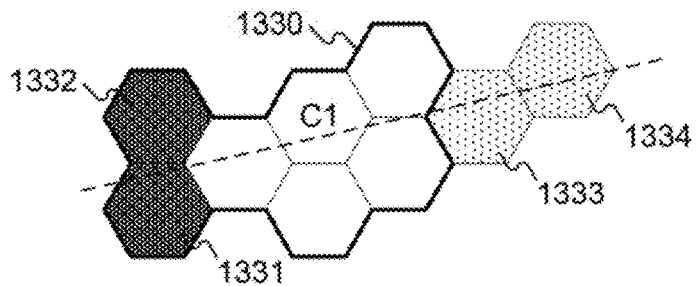
Figure 13E:
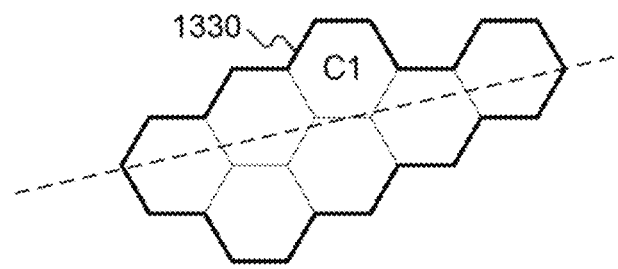

Cluster C1 may be adjusted dynamically as time passes and/or as additional informational reports are received. For example, C1 may be dynamically adjusted as cells within the cluster expire and as new cells are added. As shown in FIG. 13D, cells 1331 and 1332 may be expiring. For example, cells 1331 and 1332 may have expiration periods that have lapsed (as indicated by the darker shading in these cells). It may be assumed that the reported event condition associated with those locations is no longer present (e.g., the traffic jam has cleared). Cells 1331 and 1332 may be removed from cluster 1330 and the database entry for cluster C1 may be updated accordingly. Further, new informational reports may be received including events reported within cells 1333 and 1334. The reported events may be determined to be associated with cluster 1330 and therefore may be associated with cluster ID C1. As shown in FIG. 13E, cells 1331 and 1332 may be removed from cluster 1330 and cells 1333 and 1334 may be added. Accordingly, using the disclosed methods, a consistent cluster ID may be reported for the event associated with cluster C1.

Figure 13F:
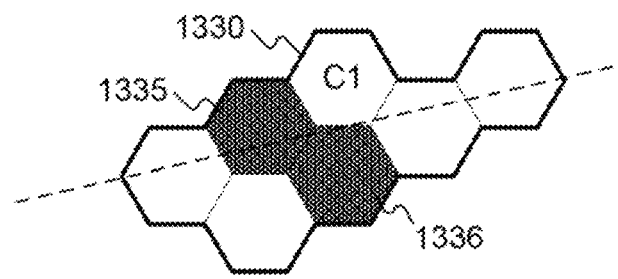
Figure 13G:
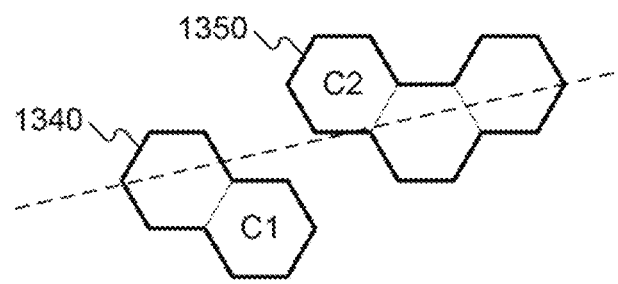

Further, in some embodiments, clusters may be split into two or more clusters. For example, it may be determined that two or more events are no longer linked, and their respective cells should no longer be associated with the same cluster identifier. Accordingly, database entries may be updated, or new database entries may be generated to reflect the separate clusters. In some embodiments, clusters may be split as cells expire. For example, as shown in FIG. 13F, cells 1335 and 1336 may have reached the end of their expiration period. Accordingly, as shown in FIG. 13G, cells 1335 and 1336 may be removed from cluster 1330. This may result in two distinct clusters 1340 and 1350. In some embodiments, the cluster identifier, C1, for clusters 1340 and 1350 may be maintained. For example, based on the type of events reported, previous association between the events, relatively close event locations, or other factors, it may be determined that clusters 1340 and 1350 are associated with the same event and should maintain the same identifier. In other embodiments, separate cluster identifiers may be assigned to clusters 1340 and 1350. For example, as shown in FIG. 13G, cluster 1340 may be assigned cluster identifier C1 and cluster 1350 may be assigned cluster identifier C2. In some embodiments, new unique cluster identifiers may be used, such as C3 and C4.

Figure 14:
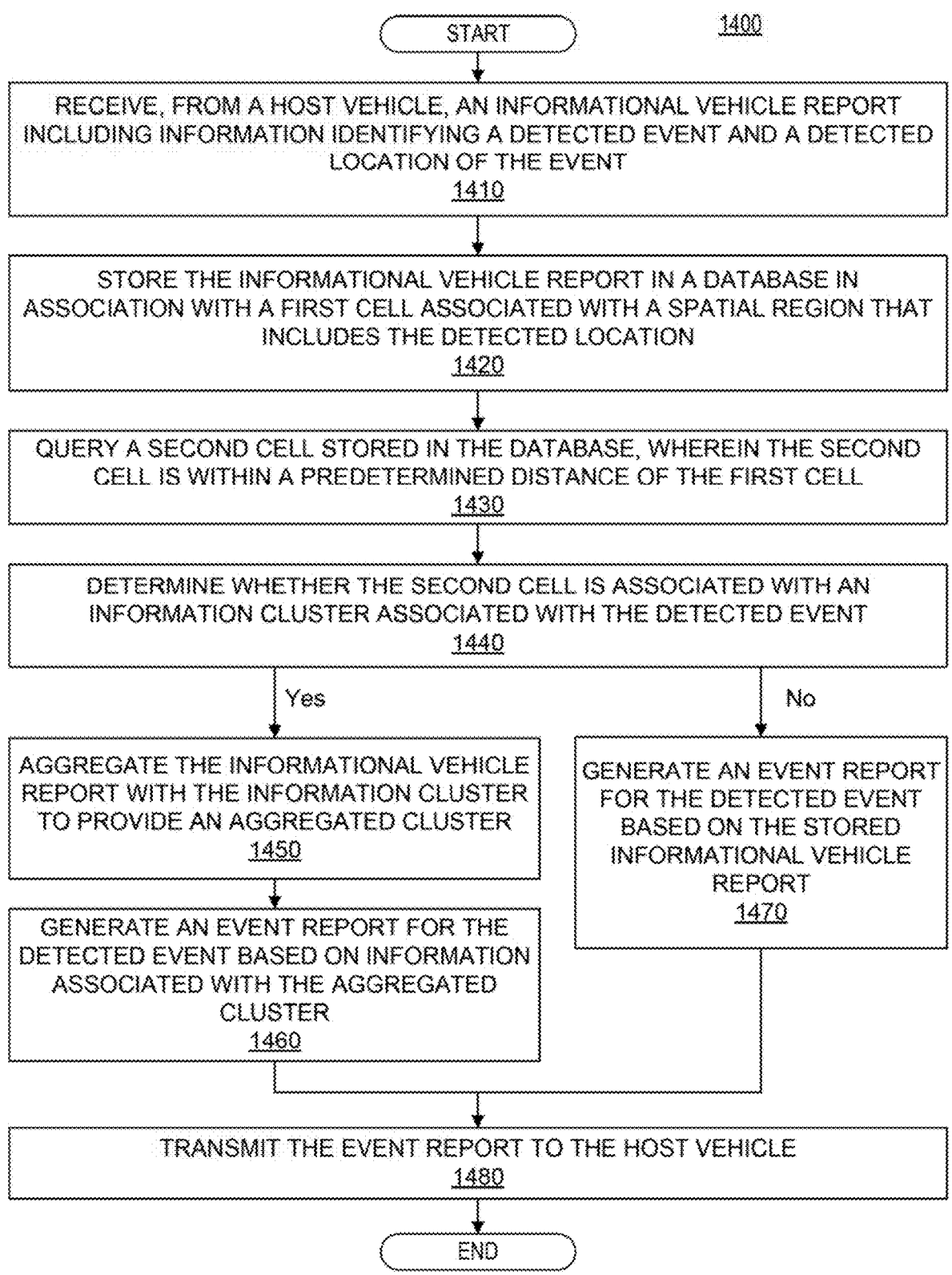
FIG. 14 is a flowchart showing an example process for aggregating informational reports received from a plurality of vehicles consistent with disclosed embodiments.

FIG. 14 is a flowchart showing an example process 1400 for aggregating informational reports received from a plurality of vehicles consistent with disclosed embodiments. Process 1400 may be performed by at least one processing device included on a server. In some embodiments, a non-transitory computer readable medium may contain instructions that when executed by a processor cause the processor to perform process 1400. Process 1400 is provided by way of example and is not necessarily limited to the steps shown in FIG. 14. Any steps or processes of the various embodiments described throughout the present disclosure may also be included in process 1400.

At step 1410, process 1400 may include receiving, from a first vehicle, an informational vehicle report. The informational vehicle report may include information identifying a detected event and location of the event in an environment of a host vehicle. In some embodiments, the information identifying the detected event may include one or more images captured from a camera on board the host vehicle.

Alternatively, or additionally, the information identifying the detected event may include information derived from an image captured by a camera on board the host vehicle. For example, the information identifying the detected event may include an event type (e.g., stopped vehicle, pedestrian, fog, rain, traffic jam, road barrier, traffic sign, road marking, pothole, etc.), characteristics of the event (e.g., the type of stopped vehicle), or any other suitable event-identifying information. As yet another example, the information identifying the detected event includes a LIDAR point cloud, a point cloud developed from processed images, or RADAR output. The detected location of the event in the environment of the host vehicle may be included as GPS coordinates or other type of coordinates. The location of the detected event may be in the environment of the host vehicle At step 1420, process 1400 may include storing the informational vehicle report in a database in association with a first cell. The first cell may be associated with a spatial region that includes the detected location. In some embodiments, the first cell may be associated with an expiration period, as discussed above. For example, information associated with the stored informational vehicle report or may be set to expire within a certain time from receiving the informational vehicle report. In some embodiments, a duration of the expiration period is based on a type of the detected event. The duration of the expiration period may be based on other factors, such as a location of the first cell, a time associated with the informational vehicle report, historical data associated with the first cell, or other information.

At step 1430, process 1400 may include querying a second cell stored in the database. In some embodiments, the second cell may be within a predetermined distance of the first cell. In some embodiments, the second cell may be adjacent to the first cell. At step 1440, process 1400 may include determining whether the second cell is associated with an information cluster associated with the detected event. Determining whether the second cell is associated with an information cluster associated with the detected event may include comparing the information identifying the detected event with information stored in association with the second cell.

When the second cell is associated with information also identifying the event, at step 1450, process 1400 may include aggregating the informational vehicle report of the first cell with the information cluster associated with the second cell to provide an aggregated cluster. In some embodiments, step 1450 may further include associating the aggregated cluster with a cluster identifier associated with the second cell. At step 1460, process 1400 may include generating an event report for the detected event based on information associated with the aggregated cluster. In some embodiments, generating the first event report for the event based on information associated with the first cluster may include averaging the location in the environment of the host vehicle with a location associated with the second cell.

When the second cell is not associated with information identifying the event, at step 1470, process 1400 may include generating the event report for the detected event based on the stored informational vehicle report. Process 1400 may then proceed to step 1480 of transmitting the event report (generated in either step 1460 or 1470) to the host vehicle. The first event report or the second event report may be transmitted to the plurality of vehicles over a network. For example, the network may include the Internet or a cellular network.

In some embodiments, one or more additional steps may be performed in addition to those illustrated in FIG. 14. For example, in some embodiments, process 1400 may further include querying a third cell stored in the database. The third cell may be associated with the aggregated cluster and may be located between the first cell and the second cell. Process 1400 may further include determining that an expiration period of the third cell has lapsed. Accordingly, process 1400 may include separating the aggregated cluster into a first cluster associated with the first cell and a second cluster associated with the second cell. Accordingly, the cluster may be split as discussed in further detail above.

Consistent with another embodiment, a method for reporting events to a plurality of vehicles may include receiving, from a first host vehicle, a first host vehicle report. The first host vehicle report may include information identifying a first event and a first location in an environment of the first host vehicle. The method may further include storing the first host vehicle report in a database in association with a first cell. The first cell may be associated with a region that includes the first location.

The method may include receiving, from a second host vehicle, a second host vehicle report. The second host vehicle report may include information identifying a second event and a second location in an environment of the second host vehicle. The method may include storing the second host vehicle report in the database in association with a second cell. The second cell may be associated with a region that includes the second location. In some embodiments, the first cell may be within a predetermined distance of the second cell.

The method may include analyzing the information identifying the first event and the information identifying the second event to determine that the first event and the second event are related. Analyzing the information identifying the first event and the information identifying the second event may include determining at least one commonality. For example, the at least one commonality may include a stopped vehicle or a plurality of stopped vehicles. As another example, the at least one commonality may include a pothole. In some cases, the at least one commonality may relate to a characteristic of the detected condition (e.g., both reports involve a pedestrian wearing a red coat, the locations for two-previously unassociated events are linked by new location determination between the two earlier determined locations (e.g., suggesting the actual location of a single event occurs between the two earlier determined locations), or based on any other characteristic suggesting two previously unassociated events refer to the same event.

Where an event or cluster associated with a first cell (e.g., a first physical location in space) and another event or cluster associated with a second cell different from the first are determined to be related, the related events/clusters can be aggregated. The aggregated events/clusters may be associated with either the first cell or the second cell based on a determination of which physical location is more likely associated with the related events/clusters (e.g., an average of the associated locations may place the aggregated events/clusters in one of the two cells even where the events/clusters before aggregation were associated with two or more different cells). An event report may be generated for the aggregated cluster. In some embodiments, generating the event report for the cluster may include averaging the first location and the second location. In other embodiments, generating the event report for the cluster may include analyzing the information identifying the first event and the information identifying the second event. The method may further include transmitting the event report to the plurality of host vehicles as a navigational report upon which the plurality of vehicles may use in determining navigational actions.

Navigational report generation based on clustered events/conditions may occur at any suitable interval. For highly transient events, such as a detected pedestrian in a roadway, which is likely to continue moving to new locations in or out of the roadway, navigational reports may be generated on a more frequent basis than for events conditions that are less transient (e.g., detected potholes). In other words, many event reports relating to a single detected pothole may be aggregated before sending a navigational report or an updated navigational report to vehicles. On the other hand, fewer event reports relating to a single detected pedestrian may be aggregated before generating a navigational report relating to the detected pedestrian. In some cases, certain event/condition types may be associated with a predetermined dwell time for navigational report generation. For example, a dwell time for generating a navigational report based on a transient condition such as a detected pedestrian may be shorter than a dwell time for generating a navigational report based on a less transient condition, such as a detected pothole. Further, dwell times may be based on similar factors as the duration of the expiration period, as discussed above. For example, the dwell time may be based on a location of the event, a time associated with the event, or the like.

As previously discussed, the disclosed systems and methods for receiving crowd sourced road event/condition information, aggregating the received information into related event/condition clusters, and generating navigational reports based on the aggregated clusters may enable a host vehicle to make navigational decisions based on richer information than would be otherwise available solely based on the sensors of the host vehicle alone. For example, in some embodiments, a first host vehicle and a second host vehicle may be traveling in opposite directions along a road. Both may experience a common event (e.g., a vehicle stopped in a road), and both may generate informational reports relative to the detected event and transmit the generated reports to the server-based system. The server-based system may aggregate the event reports into a common cluster (e.g., based on a determination that the detected locations of the stopped car as detected by the first and second host vehicles fall within a common cell). Because the first and second host vehicles detected the stopped car from different perspectives (e.g., as the first vehicle traveled toward the rear of the stopped vehicle and as the second vehicle traveled toward the front of the stopped vehicle), the event reports generated by the respective host vehicles may contain information the server may use to determine that the stopped vehicle is not part of a traffic jam. For example, the host vehicle approaching the front of the stopped vehicle may report that no other vehicles are present ahead of the stopped vehicle. Based on that report (or even the absence of a report by the host vehicle approaching the front of other stopped vehicles at locations ahead of the stopped vehicle), the server may determine that the stopped vehicle is not part of a traffic jam. The server may generate a navigational report based on this determination and forward to both host vehicles. The vehicle approaching the stopped vehicle from the rear may use this information to determine that it is appropriate to navigate around the stopped vehicle, as the stopped vehicle is not part of a traffic jam (a condition the approaching host vehicle may not have been able to determine on its own if the stopped vehicle obscured a view of one or more of its sensors ahead of the stopped vehicle). In other embodiments, the first host vehicle and the second host vehicle may be traveling within a predetermined distance of each other. In yet other embodiments, the first host vehicle may be within a field of view of a camera on board the second vehicle.

Figure 15:
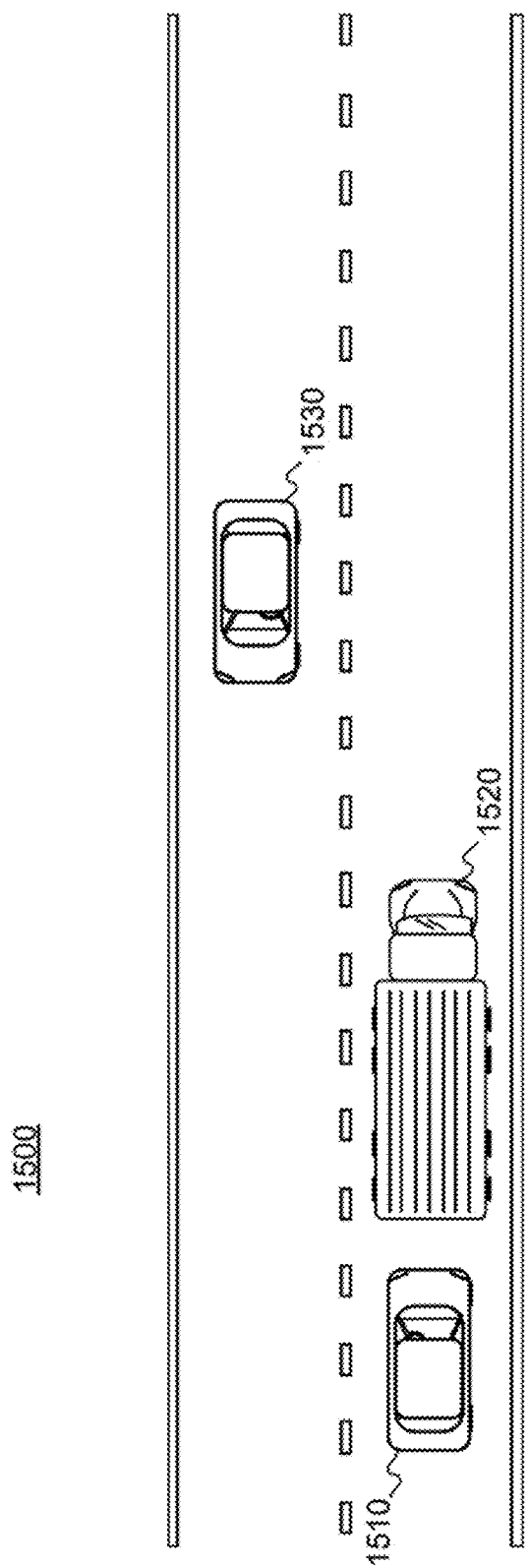
FIG. 15 illustrates an example environment for aggregating event reports based on multiple vantage points consistent with the disclosed embodiments.

FIG. 15 illustrates an example environment 1500 for aggregating event reports based on multiple vantage points consistent with the disclosed embodiments. Environment 1500 may comprise a roadway in which vehicle 1520 is stopped. As shown in FIG. 15, host vehicle 1510 may approach stopped vehicle 1520 from behind and may detect stopped vehicle 1520. Host vehicle 1510 may generate an informational report identifying stopped vehicle 1520. As discussed above, host vehicle 1510 may not be able to determine whether stopped vehicle 1520 is a single stopped vehicle, or whether stopped vehicle 1520 is part of a traffic jam. Based on the techniques described above, information from additional vehicles may provide further context as to the nature of the event. For example, host vehicle 1530, which may be traveling along the roadway in a direction opposite to host vehicle 1510 and stopped vehicle 1520, may detect stopped vehicle 1520. Host vehicle 1530 may generate an informational report identifying stopped vehicle 1520. The event identified in the informational report of host vehicle 1530 may be clustered with the event identified by host vehicle 1510 using the methods described above. Based on the informational report of host vehicle 1530 and the fact that host vehicle 1530 did not report any stopped vehicles ahead of stopped vehicle 1520, stopped vehicle 1520 may be determined to be a lone stopped vehicle. Accordingly, a navigational report may be transmitted to host vehicle 1510 indicating that stopped vehicle 1520 is not part of a traffic, am. Accordingly, host vehicle 1510 may navigate around stopped vehicle 1520.

Figure 16:
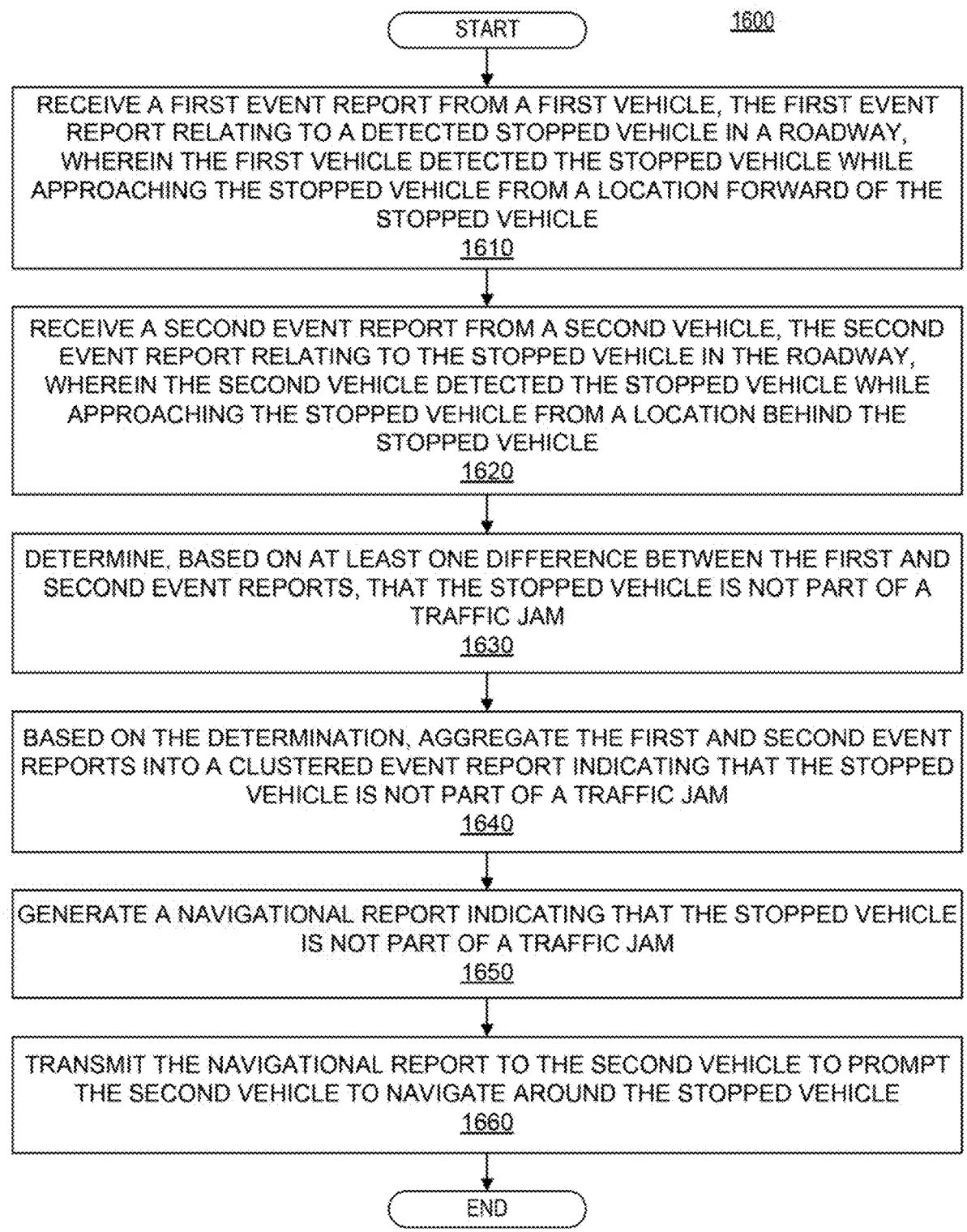
FIG. 16 is a flowchart showing an example process for aggregating informational reports received from a plurality of vehicles consistent with disclosed embodiments.

FIG. 16 is a flowchart showing an example process 1600 for aggregating informational reports received from a plurality of vehicles consistent with disclosed embodiments. Process 1600 may be performed by at least one processing device included on a server. In some embodiments, a non-transitory computer readable medium may contain instructions that when executed by a processor cause the processor to perform process 1600. Process 1600 is provided by way of example and is not necessarily limited to the steps shown in FIG. 16. Any steps or processes of the various embodiments described throughout the present disclosure may also be included in process 1600.

At step 1610, process 1600 may include receiving a first event report from a first vehicle. The first event report may relate to a detected stopped vehicle in a roadway. The first event report may be an informational report as described above. In some embodiments, the event report may include images captured from one or more cameras aboard the first vehicle. In other embodiments, the first event report may include information derived from one or more captured images (e.g., based on processor-based image analysis of captured images). The first event report may include other information, such as location information (e.g., GPS information), LIDAR point clouds from one or more LIDAR devices, RADAR outputs, identified road features or road condition (e.g., identified road markings and corresponding locations, potholes and corresponding locations, stopped cars and corresponding locations, pedestrians and corresponding locations), or other relevant information. In some embodiments, the first vehicle may have detected the stopped vehicle while approaching the stopped vehicle from a location forward of the stopped vehicle. For example, the first vehicle may correspond to host vehicle 1530, as described above with respect to FIG. 15. Host vehicle 1530 may detect stopped vehicle 1520 while approaching stopped vehicle 1520 from a location forward of the stopped vehicle. In some embodiments, the first vehicle may approach the stopped vehicle from other locations, such as a location to the side of the stopped vehicle, etc.

At step 1620, process 1600 may further include receiving a second event report from a second vehicle. The second event report relating to the stopped vehicle in the roadway. The second event report may be of a similar type to the first event report. Accordingly, the second event report may include any of the information described above with respect to the first event report. The second vehicle may have detected the stopped vehicle while approaching the stopped vehicle from a location behind the stopped vehicle. For example, the second vehicle may correspond to host vehicle 1510 and may detect stopped vehicle 1520 from a location behind stopped vehicle 1520, as shown in FIG. 15. In some embodiments, the second vehicle may not be able to determine whether the stopped vehicle is part of a traffic jam using onboard sensors. For example, the stopped vehicle may at least partially block a view of a camera, LIDAR sensor, or other sensor of the second vehicle such that the second vehicle (e.g., a processor onboard the second vehicle) may not be able to determine whether additional vehicles are stopped in front of the stopped vehicle.

At step 1630, process 1600 may include determining, based on at least one difference between the first and second event reports, that the stopped vehicle is not part of a traffic jam. For example, the difference between the first and second event reports may comprise an indication in the first event report that no other cars are stopped in front of the stopped vehicle. For example, when approaching the stopped vehicle from the location forward of the stopped vehicle, first vehicle may not detect any vehicles stopped in front of the stopped vehicle, which may be indicated in the first event report. In some embodiments, the first event report may include other information indicating that the stopped vehicle is not part of a traffic jam. For example, based on images captured by a camera onboard the first vehicle, the first event report may include information indicating that the stopped vehicle is disabled, stopped due to an obstacle in the road, parked temporarily (e.g., delivering a package, etc.), a service vehicle (e.g., an emergency vehicle, a street cleaning vehicle, a utilities service vehicle, a school bus, etc.), part of a construction project, or any other indicators that the vehicle is not part of a traffic jam.

At step 1640, process 1600 may include aggregating, based on the determination, the first and second event reports into a clustered event report indicating that the stopped vehicle is not part of a traffic jam. For example, the clustered event report may be aggregated based on process 1400 or any of the operations described with respect to FIGS. 13A-13G. For example, step 1640 may include updating a database to include information associated with the first and second event reports. In some embodiments, step 1640 may include associating the aggregated clustered event report with a cluster identifier associated with the first event report.

At step 1650, process 1600 may include generating a navigational report indicating that the stopped vehicle is not part of a traffic jam. The navigational report may include information included in and/or derived from the aggregated clustered event. For example, the navigational report may include a location of the stopped vehicle, information regarding a reason for the vehicle being stopped (e.g., derived from the first event report), a time associated with the first event report, or any other relevant information. In some embodiments, the navigational report may include instructions for the second vehicle to navigate around the stopped vehicle. At step 1660, process 1600 may include transmitting the navigational report to the second vehicle to prompt the second vehicle to navigate around the stopped vehicle. In some embodiments, transmitting the navigational report may comprise transmitting the navigational report over a network, such as a cellular network, the Internet, or any other form of network. For example, the second vehicle may receive the navigational report through wireless transceiver 172, as discussed above.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for aggregating informational reports received from a plurality of vehicles, the system comprising:
   at least one processor comprising circuitry and a memory, wherein the memory includes instructions that when executed by the circuitry cause the at least one processor to:
      receive an informational vehicle report, wherein the informational vehicle report includes information identifying a detected event and a detected location of the event in an environment of a host vehicle;

store the informational vehicle report in a database in association with a first cell, wherein the first cell is associated with a first spatial region that includes the detected location;

query a second cell stored in the database, wherein the second cell is associated with a second spatial region within a predetermined distance of the first spatial region;

determine whether the second cell is associated with an information cluster associated with the detected event;

when the second cell is associated with an information cluster associated with the detected event:
aggregate the informational vehicle report of the first cell with the information cluster associated with the second cell to provide an aggregated cluster, wherein the aggregated cluster is associated with an aggregated spatial region including the first spatial region and the second spatial region;
generate an event report for the detected event based on information associated with the aggregated cluster; and
transmit the event report to the host vehicle; and when the second cell is not associated with an information cluster associated with the detected event:
generate the event report for the detected event based on the stored informational vehicle report; and
transmit the event report to the host vehicle.

2. The system of claim 1, wherein the information identifying the detected event includes an image captured from a camera on board the host vehicle.

3. The system of claim 1, wherein the information identifying the detected event includes information derived from an image captured by a camera on board the host vehicle.

4. The system of claim 1, wherein the information identifying the detected event includes a LIDAR point cloud or RADAR output.

5. The system of claim 1, wherein the location of the detected event is in the environment of the host vehicle.

6. The system of claim 1, wherein the first cell is associated with an expiration period.

7. The system of claim 6, wherein a duration of the expiration period is based on a type of the detected event.

8. The system of claim 1, wherein the memory includes instructions that when executed by the circuitry cause the at least one processor to:
query a third cell stored in the database, the third cell being associated with the aggregated cluster and located between the first cell and the second cell;
determine that an expiration period of the third cell has lapsed; and
separate the aggregated cluster into a first cluster associated with the first cell and a second cluster associated with the second cell.

9. The system of claim 1, wherein the memory includes instructions that when executed by the circuitry cause the at least one processor to associate the aggregated cluster with a cluster identifier associated with the second cell.

10. The system of claim 1, wherein the second cell is associated with an expiration period and wherein the memory includes instructions that when executed by the circuitry cause the at least one processor to, when the second cell is associated with an information cluster associated with the detected event:
determine, based on the expiration period, that the second cell has expired; and
transmit an additional event report to an additional vehicle located in the first spatial region, wherein the additional event report is associated with a spatial region excluding the second spatial region based on the determination the second cell has expired.

11. A method for aggregating informational reports received from a plurality of vehicles, the method comprising:
receiving an informational vehicle report, wherein the informational vehicle report includes information identifying a detected event and a detected location of the event in an environment of a host vehicle;
storing the informational vehicle report in a database in association with a first cell, wherein the first cell is associated with a first spatial region that includes the detected location;
querying a second cell stored in the database, wherein the second cell is associated with a second spatial region within a predetermined distance of the first spatial region;
determining whether the second cell is associated with an information cluster associated with the detected event;
when the second cell is associated with an information cluster associated with the detected event:
aggregating the informational vehicle report of the first cell with the information cluster associated with the second cell to provide an aggregated cluster, wherein the aggregated cluster is associated with an aggregated spatial region including the first spatial region and the second spatial region;
generating an event report for the detected event based on information associated with the aggregated cluster; and
transmitting the event report to the host vehicle; and
when the second cell is not associated with an information cluster associated with the detected event:
generating the event report for the detected event based on the stored informational vehicle report; and
transmitting the event report to the host vehicle.

12. The method of claim 11, wherein the information identifying the detected event includes an image captured from a camera on board the host vehicle.

13. The method of claim 11, wherein the information identifying the detected event includes information derived from an image captured by a camera on board the host vehicle.

14. The method of claim 11, wherein the information identifying the detected event includes a LIDAR point cloud or RADAR output.

15. The method of claim 11, wherein the location of the detected event is in the environment of the host vehicle.

16. The method of claim 11, wherein the first cell is associated with an expiration period.

17. The method of claim 16, wherein a duration of the expiration period is based on a type of the detected event.

18. The method of claim 11, wherein the method further comprises:
querying a third cell stored in the database, the third cell being associated with the aggregated cluster and located between the first cell and the second cell;
determining that an expiration period of the third cell has lapsed; and
separating the aggregated cluster into a first cluster associated with the first cell and a second cluster associated with the second cell.

19. The method of claim 11, wherein the method further comprises associating the aggregated cluster with a cluster identifier associated with the second cell.

20. A non-transitory computer readable medium containing instructions that when executed by at least one processor, cause the at least one processor to perform a method for aggregating informational reports received from a plurality of vehicles, the method comprising:
- receiving an informational vehicle report, wherein the informational vehicle report includes information identifying a detected event and a detected location of the event in an environment of a host vehicle;
- storing the informational vehicle report in a database in association with a first cell, wherein the first cell is associated with a first spatial region that includes the detected location;
- querying a second cell stored in the database, wherein the second cell is associated with a second spatial region within a predetermined distance of the first spatial region;
- determining whether the second cell is associated with an information cluster associated with the detected event;
- when the second cell is associated with an information cluster associated with the detected event:
  - aggregating the informational vehicle report of the first cell with the information cluster associated with the second cell to provide an aggregated cluster, wherein the aggregated cluster is associated with an aggregated spatial region including the first spatial region and the second spatial region;
  - generating an event report for the detected event based on information associated with the aggregated cluster; and
  - transmitting the event report to the host vehicle; and
- when the second cell is not associated with an information cluster associated with the detected event:
  - generating the event report for the detected event based on the stored informational vehicle report; and
  - transmitting the event report to the host vehicle.

* * * * *